US012675818B2

(12) United States Patent
Difonzo et al.

(10) Patent No.: US 12,675,818 B2
(45) Date of Patent: Jul. 7, 2026

(54) PRODUCT AS A KEY FOR CONTEXT-BASED IMAGE GENERATION

(71) Applicant: Zazzle Inc., Menlo Park, CA (US)

(72) Inventors: Matthew Difonzo, Belmont, CA (US); Leslie Young Harvill, Olympia, WA (US)

(73) Assignee: Zazzle Inc., Menlo Park, CA (US)

( * ) Notice: Subject to any disclaimer, the term of this patent is extended or adjusted under 35 U.S.C. 154(b) by 343 days.

(21) Appl. No.: 18/219,527

(22) Filed: Jul. 7, 2023

(65) Prior Publication Data

US 2025/0014246 A1       Jan. 9, 2025

(51) Int. Cl.
  *G06T 11/60*       (2026.01)
  *G06Q 30/0601*       (2023.01)
(52) U.S. Cl.
  CPC .......... *G06T 11/60* (2013.01); *G06Q 30/0621* (2013.01); *G06T 2210/16* (2013.01)
(58) Field of Classification Search
  CPC . G06T 11/60; G06T 2210/16; G06Q 30/0621; G06N 3/02
  See application file for complete search history.

(56) References Cited

U.S. PATENT DOCUMENTS

2013/0060801 A1 *   3/2013   Beaver, III ........... H04N 1/3871
                                                              707/758
2017/0017647 A1 *   1/2017   Musuluri ................ G06F 16/94
(Continued)

FOREIGN PATENT DOCUMENTS

KR       2023 0012243 A      1/2023
KR       102 539 376 B1      6/2023

OTHER PUBLICATIONS

Gdpicture.com, "Introduction to the New Key-Value Pair Data Extractor for the OCR Engine", https://www.gdpicture.com/blog/new-key-value-pair-data-extractor-ocr-engine, Jun. 20, 2022 (Year: 2022).*

(Continued)

*Primary Examiner* — Michelle L Sams
(74) *Attorney, Agent, or Firm* — Patterson + Sheridan, LLP; Malgorzata A. Kulczycka

(57)       ABSTRACT

In some embodiments, a method for using a custom product as a key for context-based image generation comprises: receiving, by a visualization service of a computer collaboration system, a graphical representation of a custom digital product; determining one or more regions for customizing regions; for a region of the regions: determining a set of phrases that are specific to the custom digital product and a customization process for customizing the custom digital product; based on the set of phrases, generating a synthetic image generation request; transmitting request to an AI based image generator configured to generate synthetic images; causing the AI-based generator to: generate a customized synthetic image based on the request and a repository of images; wherein the customized synthetic image is not a copy of any image from the repository of images; transmit the customized synthetic image to the computer collaboration system; including the image in the region; causing displaying the graphical visualization of the custom digital product along with the customized synthetic image in the region.

17 Claims, 15 Drawing Sheets
(7 of 15 Drawing Sheet(s) Filed in Color)

1F102 Request

"Women's Outdoor Camping Graphics T-Shirt"

1F104 On-the-fly Generated Synthetic Image

(56)                References Cited

U.S. PATENT DOCUMENTS

2019/0050427 A1*   2/2019   Wiesel .................... G06T 19/00
2020/0159871 A1*   5/2020   Bowen .................... G06T 11/60
2021/0272341 A1*   9/2021   Swaminathan ........... G06T 7/70

OTHER PUBLICATIONS

"Stable Diffusion is a text-to-image AI thats much more accessible than its predecessors", Anyone can use this AI art generator—thats a risk. Sep. 15, 2022. https://www.theverge.com/2022/9/15/23340673/ai-image-generation-stable-diffusion-explained-ethics-copyright-data.
"Using software that creates art on demand, some artists attempt to cash in on AIgenerated Content", Artists begin selling AI-generated artwork on stock photography websites. Sep. 16, 2022. https://arstechnica.com/information-technology/2022/09/artists-begin-selling-ai-generated-artwork-on-stock-photography-websites/.
Stable Diffusion, A latent text-to-image diffusion model. https://github.com/CompVis/stable-diffusion. Nov. 16, 2022.
How does Stable Diffusion work?—LatentDiffusion Models EXPLAINED. YouTube. https://www.youtube.com/watch?v=J87hffSMB60. Date pulled Jul. 7, 2023.
Stable Diffusion is a really big deal, Simon Willson's Weblog. https://simonwillison.net/2022/Aug/29/stable-diffusion/ . Aug. 29, 2022.
With Stable Diffusion, you may never believe what you see online again, AI image synthesis goes open source, with big implications. Benj Edwards / Stable Diffusion Sep. 6, 2022.
Extended European Search Report for European Patent Application No. 24173362.5, dated Oct. 29, 2024.
Koukoumidis Emmanouil et al: "AI-based Image Synthesis for Enriched Search and Shopping AI-based Image Synthesis for Enriched Search and Shopping", Technical Disclosure Commons, Jun. 8, 2021 (Jun. 8, 2021), XP055960246, Retrieved from the Internet: URL:https://www.tdcommons.org/cgi/viewcontent.cgi?article=5441&context=dpubs_series [retrieved on Sep. 13, 2022] * pp. 2-6 *.
European Search Report dated Oct. 14, 2024 for Application No. EP 24 17 3362.

* cited by examiner

1E104 On-the-fly Generated Synthetic Image

1E102 Request

"First Christmas as Grandma T-shirt"

1F104 On-the-fly Generated Synthetic Image

1F102 Request

"Women's
Outdoor Camping
Graphics T-Shirt"

1G102

1H102 On-the-fly
Generated Synthetic
Background

1H104 On-the-fly
Generated Synthetic
Image

1H106 On-the-fly
Generated Synthetic
Image

PRODUCT AS A KEY FOR CONTEXT-BASED IMAGE GENERATION

FIELD OF THE DISCLOSURE

One technical field of the present disclosure is digital image processing. Another technical field is computer-implemented techniques for generating digital synthetic images based on a request created from various information derived from customized digital content, customization characteristics, user profiles, and the like. Another technical field is computer-implemented techniques for merging the generated digital synthetic images with customized content using digital image processing, and producing depictions of customizable items blended with the generated synthetic images accurately and in near real-time.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

With the growth of digital computation capabilities and enhancements in manufacturing processes, goods manufacturing is transforming into the production of goods according to individual customization requests received from customer computers. This may include, for example, fulfilling online orders received from customers who use their computer systems to customize depictions of generic goods and place online orders for individually customized goods.

Many systems on the market are configured to offer users the opportunity to order products having customized attributes. For example, in the case of custom-manufactured framed products such as photos, digital images, artwork, and other products, the systems may offer the users the opportunity to order frames having customized sizes and colors.

Customizing products that have many customizable parameters may be quite challenging. The selection of customization values may have implications on the appearance of the final custom products and on the way that the final custom products are rendered. Therefore, the systems often provide functionalities for displaying depictions, e.g., synthetic views, of the customized products to help the users to visualize their customized products before the users order the products.

However, the current systems usually provide stock images as backgrounds for displaying customized products. The stock images are usually prepared in advance and are selected for displaying the customized product in a predictable and unchangeable way. Furthermore, in some situations, the stock images are rarely related to the actual product that users are customizing and ordering. Moreover, the stock images rarely allow for enhancing the users' experience as the users customize and inspect the digital depictions of the customized products displayed on computer-based display devices.

Therefore, there is a need to generate and render synthetic backgrounds and visual components for visualizing custom products efficiently and contemporaneously with the product customization process. There is a need to generate such synthetic backgrounds and visual components based on the information that is specific to the customized product as well as to the users who perform the customization. Furthermore, there is a need to generate such synthetic images on the fly and quickly enough not to cause any delay in rendering the resulting customized products superimposed with the synthetic background images, and the like. The rendering time for a frame in a real-time-rendering application should be rapid because latency appears to be a key barrier in supporting user interactions with the application.

BRIEF DESCRIPTION OF THE DRAWINGS

The patent or application file contains at least one drawing executed in color. Copies of this patent or patent application publication with color drawing will be provided by the Office upon request and payment of the necessary fee.

DESCRIPTION OF EXAMPLE EMBODIMENTS

Figure 1A:
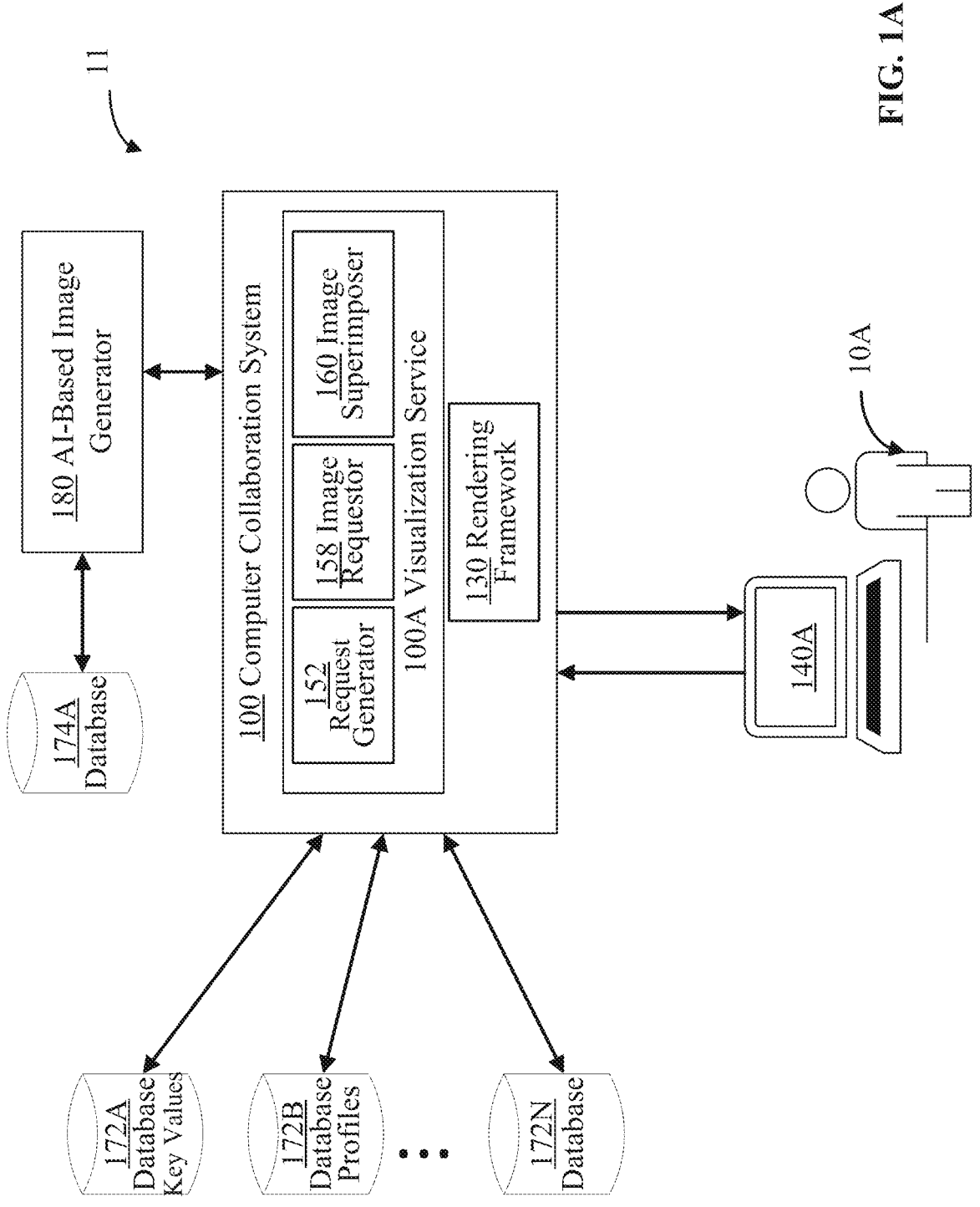
FIG. 1A is a block diagram showing an example environment for using a product as a key for context-based image generation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1. GENERAL OVERVIEW
2. GENERATING SYNTHETIC BACKGROUNDS AND IMAGES
   2.1. COMPUTATIONAL ENVIRONMENT
   2.2. SYNTHESIZED BACKGROUNDS AND IMAGES
   2.3. STABLE DIFFUSION
3. SELECTING CONTENT FOR GENERATING REQUESTS
4. EXAMPLE REQUESTS
5. BASE IMAGES
6. GENERATING SYNTHETIC BACKGROUNDS/IMAGES USING AI
   6.1. REQUESTS
   6.2. AI-BASED IMAGE GENERATOR 6.3. SYNTHETIC IMAGES
7. EXAMPLE MANUFACTURING SYSTEM
   7.1. STRUCTURAL DESCRIPTION OF AUTHOR-
     ING TOOL
   7.2. DESIGNING AN ASSET
   7.3. ASSET DEFINITION DATA
   7.4. USER DEVICES
   7.5. CLIENT APPLICATIONS
   7.6. FRONTEND SERVERS
   7.7. CORE SERVICES
   7.8. EXAMPLE MANUFACTURING SYSTEM
   7.9. EXAMPLE MANUFACTURING PROCESS
8. EXAMPLE PRODUCT COLLABORATION PLAT-
   FORM
9. EXAMPLE FLOW CHART
10. IMPLEMENTATION MECHANISMS

1. General Overview

The disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Artificial Intelligence (AI) and AI-based tools offer tremendous potential in terms of image generation and customization. For example, AI-based tools may generate synthetic images and provide a great user experience and a wealth of new capabilities for otherwise difficult and mundane work.

One of the AI-based approaches can be utilized to produce imagery for product customization, for example, in online shopping digital customization. This may include guiding a user through the process of creating and generating on-the-fly backgrounds and other images to enhance the process of customizing digital products. The on-fly-generated backgrounds and other images may be customized in various ways, including matching the backgrounds and images to the customized product in the sense, as described later.

One of the unique aspects of the presented approach is that on-the-fly-generated backgrounds and images are indeed generated on the fly, and are generated or synthesized from images of a large repository of publicly available images and using provided keywords, terms, descriptions, and the like. The on-fly-generated images are not the actual images included in the repository. Instead, the on-fly-generated images are uniquely generated and synthesized from the images stored in the repository. The algorithms for generating/synthesizing the on-the-fly AI-based images are described later.

Suppose that a customized product is a Christmas tree decoration. A corresponding on-fly-generated background may be a Christmas-related scene that would match the customized product in terms of the occasion, the color scheme, and the like. The on-the-fly generated background may be synthesized from a large set of Christmas-related pictures stored in the repository. Such an AI-based generated background may be included in, for example, a 3D visualization/depiction of the custom product, such as the Christmas tree decoration. As the product is further customized by, for example, changing the product color, a new background may be generated on-the-fly to, for example, match the color scheme of the customized product.

According to another example, suppose that a customized product is a tote and the customization includes designing a colorful application insert to be applied to the front side of the tote. A textual description of the desired colorful application may be used to generate an on-the-fly image to be used as the insert for the tote. If the description of the desired application includes, for example, the words such as "spring flowers in Paris," then the corresponding on-the-fly-generated image may be generated from a large set of pictures depicting flowers in Paris. The resulting synthesized image may depict flowers blooming in a park in Paris, or the like.

There may be situations where several on-fly-generated backgrounds and images are generated for a custom product. The backgrounds and images may be superimposed or otherwise included in the depiction of the custom product. Including such synthesized backgrounds and images allows for enhancing the quality of the product customization and enhancing the quality of the product presentation.

In some situations, the on-the-fly generated backgrounds and images are part of a product description. The description may also include information about the UV markup area, which is defined through field markup, digital markup, yellow grids, inverted yellow grids, mesh deformation, masks, or others. If, for example, the description includes a UV markup area within a customized product, then an on-fly-generated image may be applied to the area defined by the UV markup.

According to another example, if the description includes a mask area, then an on-the-fly generated background may be applied to the masked area. The mask may be used to delineate the region in which, for example, a background can be replaced using an AI-based generated image.

2. Generating Synthetic Backgrounds and Images

2.1. Computational Environment

FIG. 1 is a block diagram showing an example environment 100A for using a product as a key for context-based image generation. FIG. 1, the other drawing figures, and all of the descriptions and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

An example of an environment 11 depicted in FIG. 1A is configured to use a product as a key for context-based image generation. One of the elements of environment 11 is a computer collaboration system 100, which is described in detail later. For the clarity of the description, computer collaboration system 100 comprises a visualization service 100A, which in turn comprises a request generator 152, an image requestor 158, an image superimposer 160, and a rendering framework 130 (described in detail later). All these components are described in detail later.

Collaboration system 100 may also include other components, examples of which are described later.

In some implementations, environment 11 also includes a database 172A storing key-value pairs (described later), a database 172B storing user profiles (described later), and one or more other databases 172N for storing additional information used by various components of environment 11 and/or computer collaboration system 100.

Environment 11 may also include a database 174A that is used as a storage for, e.g., billions of digital images of publicly available digital images. Such images may be downloaded from public resources, databases, and other repositories. For example, the images may be downloaded from the Internet and may represent part of the DALL-E system (described later).

Images stored in database 174A, or in some other storage included in environment 11 may be used by an AI-based image generator 180. AI-based image generator 180 may be an AI-based application that is configured to, for example, implement the stable diffusion approach for generating or synthesizing images in response to receiving a textual query.

2.2. Synthesized Backgrounds and Images

AI-based techniques utilized in this approach may include a variety of generative AI techniques (GAI). An example of such techniques includes Stable Diffusion (SD). In this context, SD may be used to generate a digital image context for a custom product without altering the custom product itself or changing a key that refers back to the product database version of the custom product. Examples of the SD techniques are briefly described later.

Suppose that a custom product is a tote, and the tote is displayed on an online shopping website so that users may digitally customize the tote and order it. The custom product (i.e., here the tote) may be customized in a variety of ways. The customization may pertain to, for example, customizing the tote's front side. An example of such a customization is described in FIG. 1B.

Figure 1B:
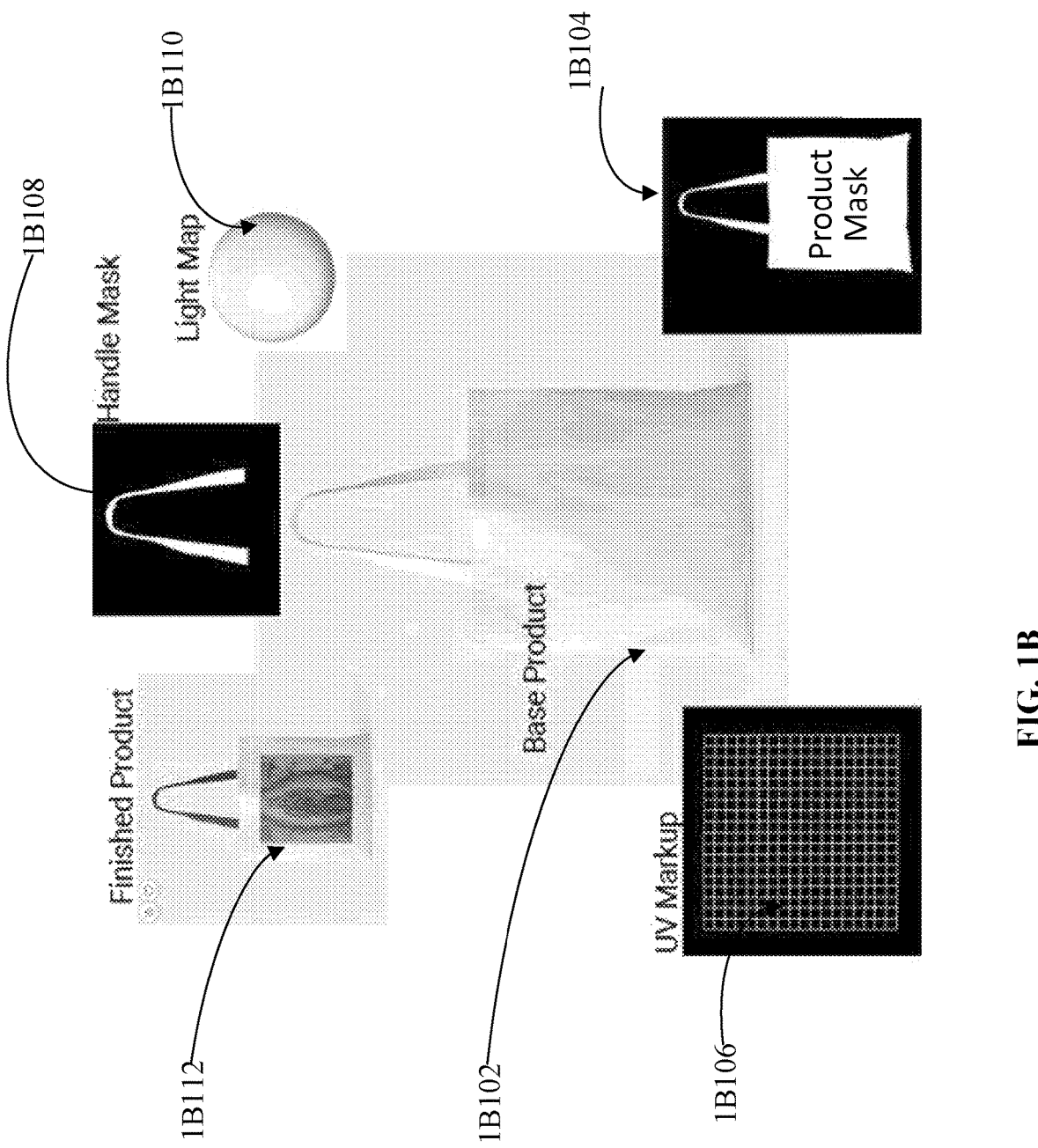
FIG. 1B is an example of options and processing byproducts.

FIG. 1B is an example of options and processing byproducts. Suppose that a base image for the front side of the custom product (e.g., the tote) is plain cloth. However, to make the tote appear more attractive on a display of the online shopping website, it might be desirable to replace the plain-cloth-front-side of the tote with an attractive image that in some sense corresponds to a user's interests, a user's profile, and the like. Furthermore, to make the tote appear more attractive on the display, it might be desirable to replace the mono-color background with an attractive background, such as an image of a beach, traveling along the beach, playing on the beach, and the like. Such images and backgrounds may be generated on-the-fly using, for example, SD which is described later.

To allow customization of a product, computer collaboration system 100 (described in FIG. 1A and later) may use one or more graphical representations of the product, and several masks used to select areas within a depiction of the product that can be customized, filled with synthesized AI-based images, and several maps to implement lighting models, light reflections and the like. The representations, masks, and maps are typically used to make the depictions of the products more attractive, more realistic, and more related to the users' interests.

FIG. 1B depicts a base product 1B102 (e.g., a tote), a few masks (e.g., a product mask 1B104, a UV markup 1B106, a handle mask 1B108), a light map 1B110, and a finished product 1B112. The depiction of base product 1B102 (a tote) shows a plain cloth tote. Product mask 1B104 is a binary mask that allows distinguishing a depiction of the tote from the background. This mask may be used to, for example, mask a depiction of the tote's background, and to allow customizing or beautifying the depiction of the tote itself. Alternatively, or as shown later in FIG. 1C, a product mask may be used to mask a depiction of the tote itself and to allow customizing or beautifying the tote's background.

UV markup 1B106 is a markup grid that will be used to map a synthesized AI-based image onto the front side of the tote. This mask may be used to, for example, define a region that corresponds to the front side of the tote, and to, for example, paste a synthesized AI-based image onto that region.

Handle mask 1B108 is a binary mask that allows distinguishing a depiction of the tote handle from a background of the tote handle. This mask may be used to, for example, mask the background of the tote's handle, and define a region of the handle itself. That, in turn, will allow customizing the color of the tote's handle, and the like.

Light map 1B110 may be used to generate light reflection characteristics for a final depiction of the custom product. This map may allow for generating light reflections, shadows, diffused light, and the like, in the final depiction of the custom product.

Finished product 1B112 is an image in which (1) the front side of the tote includes a synthesized AI-based image depicting a colorful picture, (2) the handle of the tote is shown as a green handle, and (3) the entire depiction of the custom product has been illuminated using one or more light sources and suing light map 1B110.

Figure 1C:
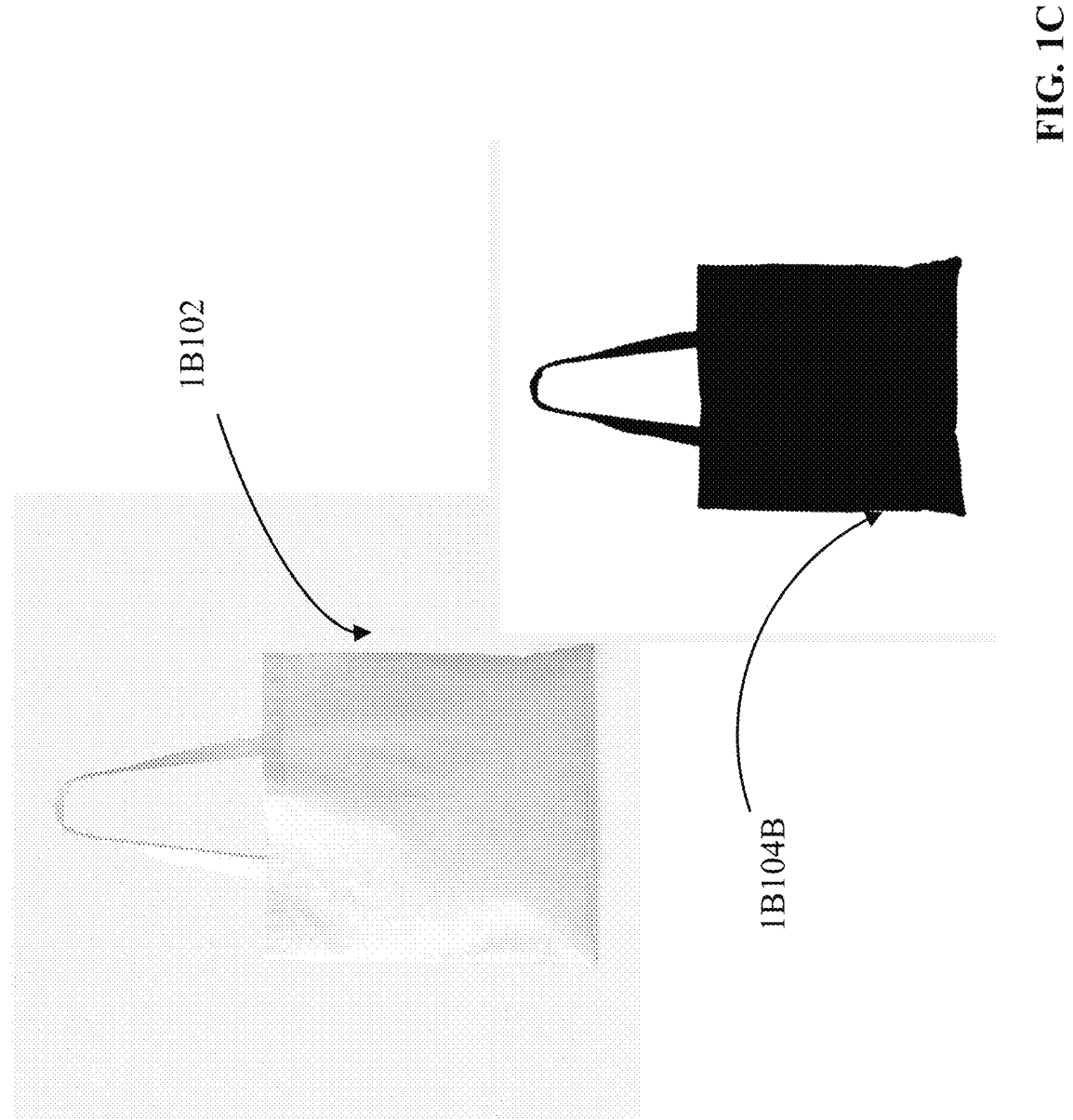
FIG. 1C is an example of options and processing byproducts.

FIG. 1C is an example of options and processing byproducts. In comparison with FIG. 1B, FIG. 1C is a variation of FIG. 1B. More specifically, a new product mask 1B104B is a binary mask that allows distinguishing a depiction of the tote from the background of the tote; however, in mask 1B104B, the tote itself is masked using black color (black pixels), while the background of the tote is shown using white color (white pixels). Depending on the masking convention, new product mask 1B104B may be used to mask (e.g., ignore) the depiction of the tote itself and make available the tote background for applying a new image. Hence, new mask 1B104B may be used to replace the background of the tote with a synthesized AI-generated image.

Using the same masking convention, product mask 1B104 (from FIG. 1B) may be used to mask (e.g., ignore) the depiction of the tote's background and make available the tote's depiction itself for applying a new image. Hence, mask 1B104 may be used to replace the depiction of the tote itself with a synthesized AI-generated image.

In other implementations, the masking convention may be reversed, therefore the masks may correspond to the reversed purposes, and thus the effects of their applications may be reversed.

To generate on-the-fly images using the described approach, first, a textual query may be generated. The query may include several keywords or phrases or the like. The keywords/phrases may be determined based on a product description of a customized product, information extracted from a user's profile, a history of the searches performed by a user, and the like. This may also include defining the context for a customization process performed on the custom product and then generating a combination of the context data and other keywords/phrases that can be determined from other sources.

A textual query may be provided to a generative AI-based application such as SD that generates output that may include one or more images. SD may be guided based on the input (i.e., the provided textual query) to provide synthesized images based on images derived from various databases.

2.3. Stable Diffusion

While the present approach is not about inventing Stable Diffusion (SD), the present approach uses the SD methodology as a tool to support the inventive aspects of the presented approach. Therefore, the herein disclosure includes a brief overview of the SD technology.

SD is a deep learning text-to-image model that is primarily used to generate detailed images conditioned on text descriptions. The model may also be applied to other applications such as inpainting, outpainting, and the like. SD may also be used to generate image-to-image translations guided by a text prompt. It was developed by Stability AI Inc. in collaboration with a number of academic researchers and non-profit organizations.

SD is a latent diffusion model used in deep generative networks. The code and model weights used in the SD approach have been released publicly, and are available via public domains. Hardware requirements typically include the requirements for a rather modest GPU with at least 8 GB VRAM. Access to cloud services is not required (which differentiates SD from other text-to-image models such as DALL-E and Midjourney.

SD uses a latent diffusion model (LDM) developed by the CompVis group at LMU Munich. Generally, the diffusion models are trained with the objective of removing successive applications of Gaussian noise on training images, which can be thought of as a sequence of denoising autoencoders.

Usually, SD consists of three parts: a variational autoencoder (VAE), a U-Net, and an optional text encoder. The VAE encoder compresses the image from pixel space to a smaller dimensional latent space, capturing a more fundamental semantic meaning of the image. Gaussian noise is iteratively applied to the compressed latent representation during the forward diffusion.

The U-Net block, composed of a ResNet backbone, denoises the output from forward diffusion backward to obtain a latent representation.

The VAE decoder generates the final image by converting the representation back into pixel space.

The denoising step can be flexibly conditioned on a string of text, an image, or another modality. The encoded conditioning data is exposed to denoising U-Nets via a cross-attention mechanism. For conditioning on text, the fixed, pre-trained CLIP VIT-L/14 text encoder is used to transform text prompts into an embedding space. The increased computational efficiency for training and generation is usually an advantage of LDMs.

SD is usually trained on pairs of images and captions taken from LAION-5B, a publicly available dataset derived from Common Crawl data scraped from the web. Typically, 5 billion image-text pairs are used that have been classified based on language and filtered into separate datasets by resolution, a predicted likelihood of containing a watermark, and predicted aesthetic scores such as subjective visual quality, and the like. The dataset was created by LAION, a German non-profit that receives funding from Stability AI.

The Stable Diffusion model was trained on three subsets of LAION-5B: laion2B-en, laion-high-resolution, and laion-aesthetics v2 5+. A third-party analysis of the model's training data identified that out of a smaller subset of 12 million images taken from the original wider dataset used, approximately 47% of the sample size of images came from 100 different domains, with Pinterest taking up 8.5% of the subset, followed by websites such as WordPress, Blogspot, Flickr, and the like. The model was trained using 256 NVidia A100 GPUs on Amazon Web Services for a total of 150,000 GPU hours, at a cost of $600,000.

Stable Diffusion may encounter some issues with degradation and inaccuracies in certain scenarios. Initial releases of the model were trained on a dataset that consists of 512×512 resolution images, meaning that the quality of generated images noticeably degrades when user specifications deviate from its "expected" 512×512 resolution.

However, the version 2.0 update of the Stable Diffusion model later introduced the ability to generate images at 768×768 resolution, which allowed for overcoming some of the above-mentioned issues.

Another challenge of Stable Diffusion relates to generating human limbs due to poor data quality of limbs in the LAION database. It appears that the model is insufficiently trained to understand human limbs and faces due to the lack of representative features in the database, and prompting the model to generate images of such type can confound the model.

Fine-tuned adaptations of Stable Diffusion created through additional retraining have been used for a variety of different use cases, from medical imaging to algorithmically-generated music. The fine-tuning process is, however, sensitive to the quality of new data; low resolution images or different resolutions from the original data can not only fail to learn the new task but degrade the overall performance of the model. Even when the model is additionally trained on high-quality images, it may be difficult for individuals to run models in consumer electronics, such as Nvidia's GeForce 30 series, which has only about 12 GB as a minimum 30 GB of VRAM is usually required.

To address the limitations of the model's initial training, end-users may opt to implement additional training to fine-tune generation outputs to match more specific use-cases. There are three methods in which user-accessible fine-tuning can be applied to a Stable Diffusion model checkpoint (1) an embedding. (2) a hypernetwork, and (3) a DreamBooth. The present approach leverages a handful of Low Rank Adaptation techniques (LoRAs) in order to accentuate certain lighting models that fall outside of the realm of typical Stable Diffusion processes when handling, for example, very light and/or very dark images. The LoRAs techniques allow fine-tunings based on the prevalence of white color in an image, and as well as based on the prevalence of black color in the image. Using these in conjunction with other lighting information allows to achieve a more polished and vibrant look of the image generated using the generative process. Additional background information for these techniques is provided in, for example, https://huggingface.co/blog/lora, https://i.redd.it/well-researched-comparison-of-training-techniques-lora-v0-vl01c5grs6ca1.png?s=cfb3d4cb7d253025ffc68f6791740f77 37604c84.

An "embedding" can be trained from a collection of user-provided images, and allows the model to generate visually similar images whenever the name of the embedding is used within a generation prompt. Embeddings are based on the "textual inversion" concept where vector representations for specific tokens used by the model's text encoder are linked to new pseudo-words. Embeddings can be used to reduce biases within the original model or mimic visual styles.

A "hyper network" is a small pre-trained neural network that is applied to various points within a larger neural network. Hypernetworks steer results toward a particular direction, allowing Stable Diffusion-based models to imitate the art style of specific artists, even if the artist is not recognized by the original model. They process the image by finding key areas of importance such as hair and eyes, and then patch these areas in secondary latent space.

DreamBooth is a deep learning generation model, which can fine-tune the model to generate precise, personalized outputs that depict a specific subject, following training via a set of images that depict the subject.

In the context of the approach presented herein, SD approach utilizes the text-to-image model to generate detailed images conditioned on text descriptions.

3. Selecting Content for Generating Requests

There are several ways of generating requests to a GAI application for providing synthesized images. One way includes specifying textual requests that include keywords and/or phrases specifying the theme or genre of the requested synthesized image. Other ways may include providing a sample image, or sample images that are in the same, or similar, genre as the requested synthesized image. Other ways of requesting a particular synthesized image can also be used.

A textual request for providing a synthesized, AI-generated image may be generated using many different approaches. According to one approach, keywords and phrases for the textual query may be generated based on a product definition of a custom product itself.

By selecting keywords/phrases for a request (i.e., for a query) from the content of a product definition of the custom product. By doing so, the computer collaboration system (e.g., system 100 in FIG. 1A) does not change the actual definition of the product itself. Instead, the system accesses the entire context, which in this case includes definitions of both the background and the custom product itself. Continuing with the tote's example above, this may allow accessing, removing or modifying individual context of the objects shown in the depiction of the customize product, such as accessing, removing, or modifying the context for a tote, or a person holding the tote, a background of the tote's depiction, and the like.

Keywords/phrases for a textual request may be obtained from, for example, key-value pairs that are included in the product definition of the custom product. A key-value pair is a pair that captures a certain characteristic of the custom product, and each custom product may have hundreds, if not millions, of the associated key-value pairs. An example of a key-value pair may include a pair {color, red}, wherein the term "color" is a characteristic key, while the term "red" is a value of the characteristic key. Key-value pairs are described in detail later.

Keywords/phrases of a textual request may be viewed as a collection of different information that was extracted either from the product itself based on the key-value pairs or based on tags attached to the product.

Keywords/phrases may also be extracted from, so-called, associated data, including a set of key-values that allow creating the product, associating the product with various groups, including social groups, and the like. For example, a custom product such as a tote may have associated with various social groups, such as a "trip to the beach" social group, a "family outing" social group, and the like.

Keywords/phrases of textual requests may also be edited by modifying them using information includes in the associated events, user groups, event groups, and the like. For example, if a user's profile indicates that the users such as is a teacher and is planning a trip to Santa Cruz Beach, then the keywords/phrases for a corresponding textual request for synthesized AI-generated images may also include words such as beach, Ocean, sand, and the like.

Figure 1D:
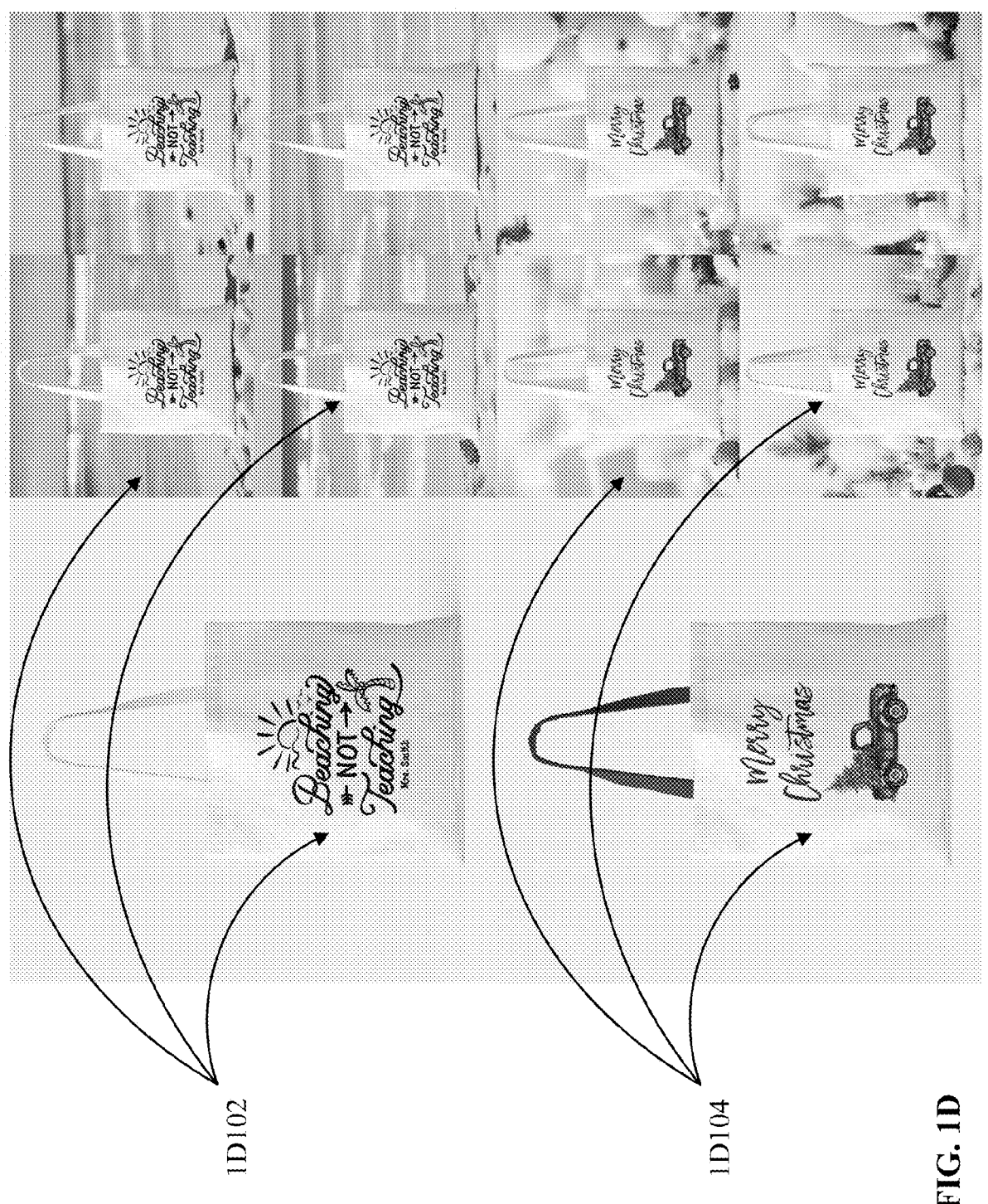
FIG. 1D is an example of customization.

FIG. 1D is an example of customization. In the depicted example, both the front side of a tote and a tote background have been customized using synthesized AI-based images.

The upper part of FIG. 1D shows an example 1D102 of a customized tote and examples of customized backgrounds related to the beach theme. More specifically, the customized tote's front page shows "Beaching Not Teaching . . . " and that the backgrounds on which the customized tote is visualized are related to a beach, sand, ocean, and the like.

According to another example, suppose that a user's profile indicates that a user is sending invitations to many of her girlfriends for Christmas Holidays. Then the keywords/phrases for a corresponding textual request for synthesized AI-generated images may also include words such as Merry Christmas, Christmas decorations, Christmas tree, and the like.

Referring again to FIG. 1D is an example 1D104 of customization. In the depicted example, both the front side of a tote and a tote background have been customized using synthesized AI-based images. The lower part of FIG. 1D shows an example of a customized tote and examples of customized backgrounds related to the Christmas-theme. More specifically, the customized tote's front page shows "Merry Christmas" and that the backgrounds on which the customized tote is visualized are related to Christmas, Christmas decorations, Christmas trees, and the like.

4. Example Requests

Keywords/phrases textual requests may also be determined based on the information about the attendees, and the physical location of the event. This type of information is usually a rich set of information associated with the product through the key values, the product, the moment, or the central use with which the product is associated. That can also include a description of key values and structure around the Zazzle "moments" patents such as U.S. patent application Ser. Nos. 18/120,403; 18/120,404; 18/120,405; 18/120, 406; and Ser. No. 18/120,407.

Keywords/phrases for textual requests may also be determined based on the user's profile. For example, if a user's profile includes information about a race and/or gender of a user, then the race/gender information may be used as keywords for a textual request. Furthermore, if a user's profile includes a user's location, a user's city, and the like, then that information may be used as keywords for a textual request.

Figure 1E:
FIG. 1E is an example of customization.

FIG. 1E is an example of customization. In the depicted example, a textual query 1E102 is "First Christmas as Grandma T-Shirt", and the corresponding custom product depicts a picture of a grandmother wearing a t-shirt having an application showing "Frist Christmas as Grandma." The background for the depicted model and t-shirt includes a Christmas tree, holiday presents, and the like. All the images included in this depiction are synthesized AI-based images obtained individually in response to submitting the textual query "First Christmas as Grandma" and "T-Shirt".

Figure 1F:
FIG. 1F is an example of customization.

FIG. 1F is an example of customization. In the depicted example, a textual query 1E102 is "Women's Outdoor Camping Graphics T-Shirt", and the corresponding custom product depicts a picture of a woman wearing a t-shirt having an application showing "I STIL PLAY Outside." The background for the depicted model and t-shirt includes a forest with trees, moss, a dirt road, and the like. All the images included in this depiction are synthesized AI-based images obtained individually in response to submitting the textual query "Women's Outdoor Camping Graphics T-Shirt".

Figure 1G:
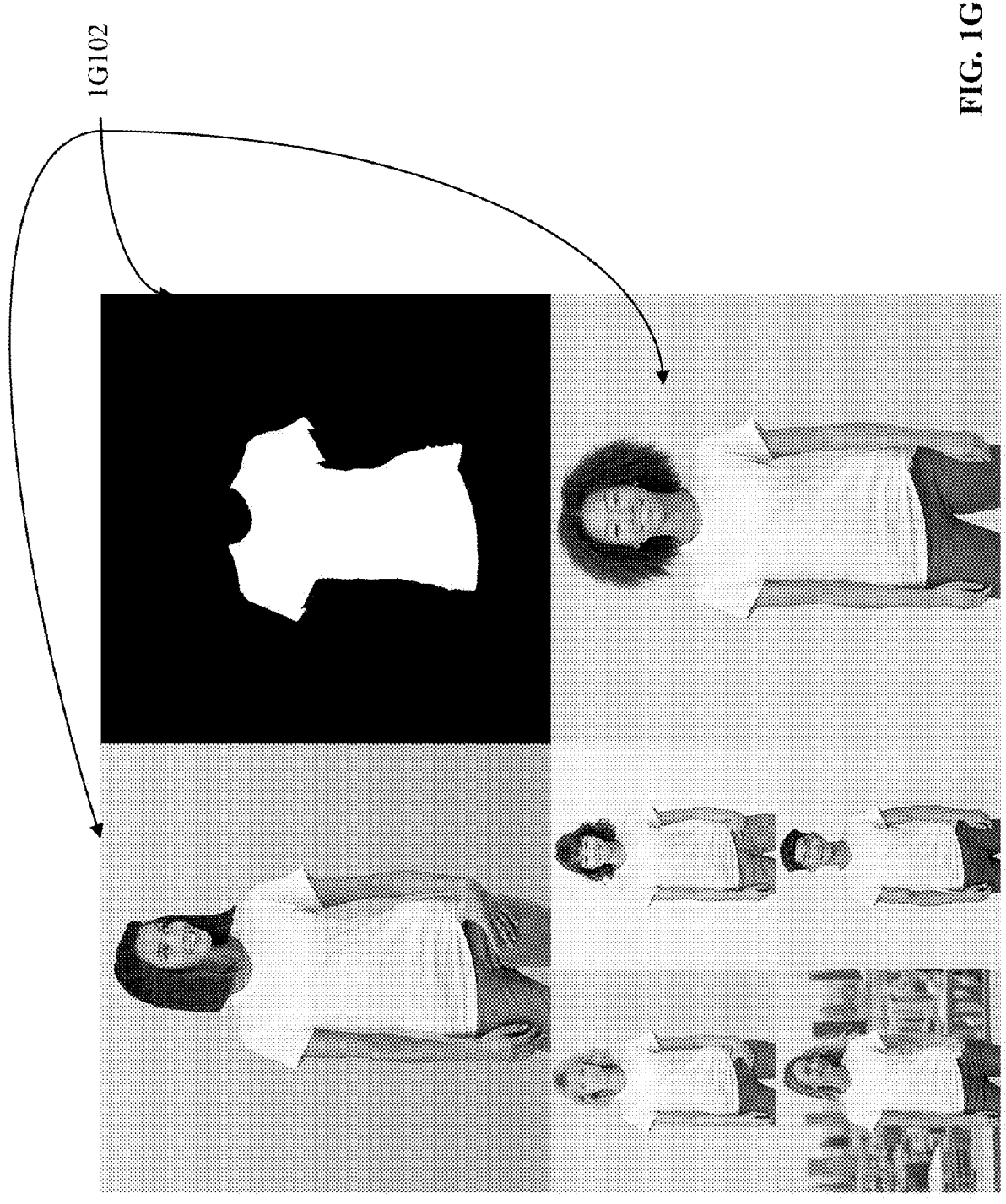
FIG. 1G is an example of customization.

FIG. 1G is an example of customization. In the depicted example, a face of a model, the gender of the model, and a background have been customized using synthesized AI-based images. FIG. 1G shows example 1G102 of customized models and backgrounds used to depict a customized t-shirt. The different models include African-American women, Caucasian women, Hispanic women, Asian men, and the like. Some backgrounds depict a cityscape-assuming that a user lives in a city. Each of the customization details, i.e., the model's faces, the model's bodies, the backgrounds, and the like are synthesized AI-based images.

Figure 1H:
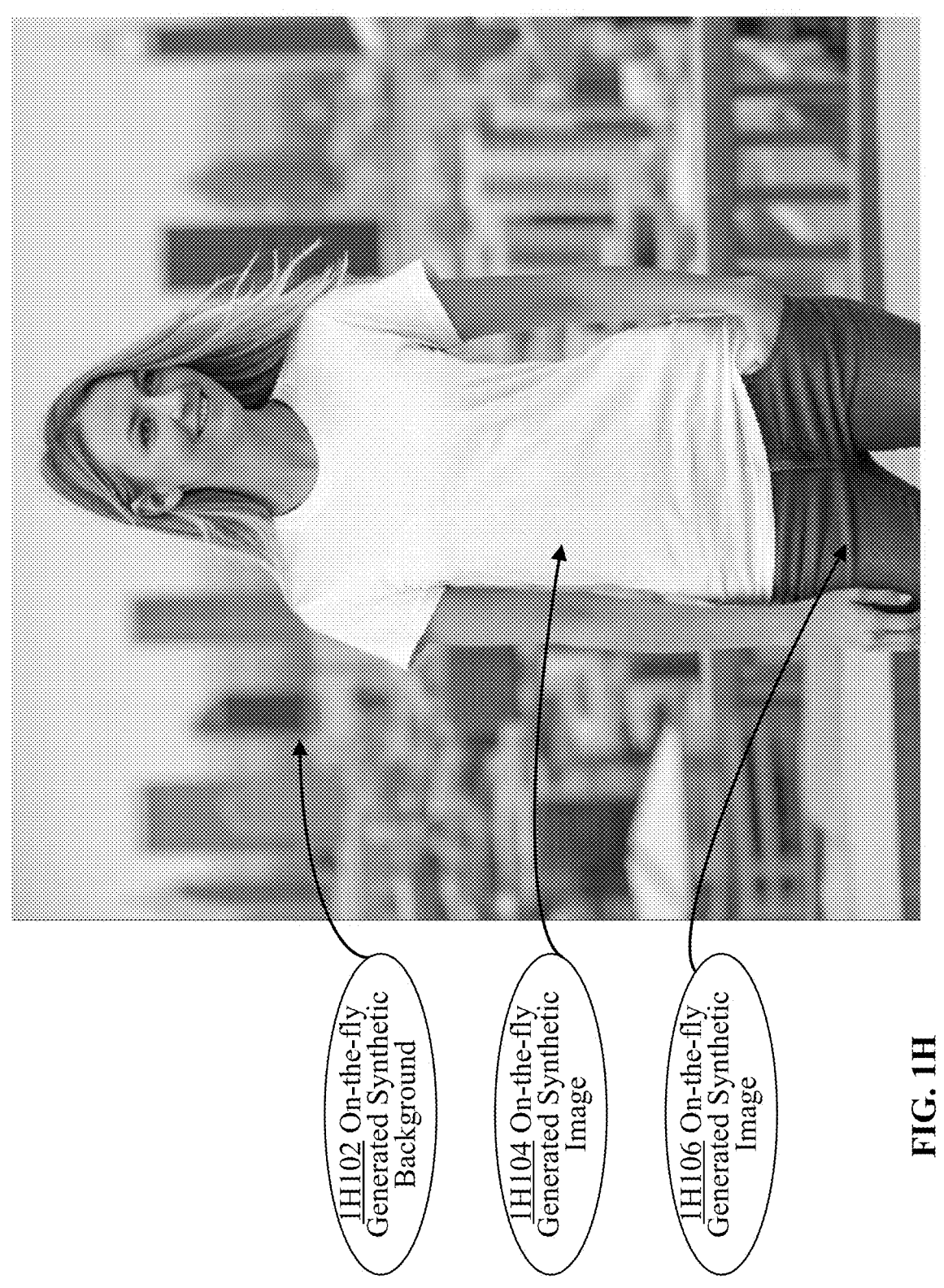
FIG. 1H is an example of customization.

FIG. 1H is an example of customization, and more specifically, it is a detailed view of a lower-left example shown in FIG. 1G. FIG. 1H shows how different synthesized AI-based images may be included in a resulting depiction of a custom product. More specifically, FIG. 1H shows that a face of a model, the gender of the model, and the background have been customized using synthesized AI-based images.

FIG. 1G shows customized models and backgrounds used to depict a customized t-shirt. More specifically, an on-the-fly generated synthetic background 1H102 is shown as a background for the model. An on-the-fly generated synthetic image 1H104 of the model used to display a t-shirt. An on-the-flue generated synthetic image 1H106 is shown as jeans that the model wears. Of course, the models may be changed on the fly by modifying the textual request to match, for example, African-American women, Caucasian women, Hispanic women, Asian women, men, and the like. Similarly, the backgrounds can be changed on the fly by modifying the textual request to match, for example, other cities, rural areas, beaches, and the like. backgrounds depict a cityscape—assuming that a user lives in a city. Each of the customization details, i.e., the model's faces, the model's bodies, the backgrounds, and the like are synthesized AI-based images generated on-the-fly.

Other ways of deriving keywords/phrases for textual requests for synthesized AI-based images may also be implemented.

5. Base Images

Base images, such as a base product image 1B102, may be obtained using different approaches. One approach includes taking photographs of a custom product in specific lighting conditions and using cameras that usually have a high resolution and a high contrast.

Figure 1I:
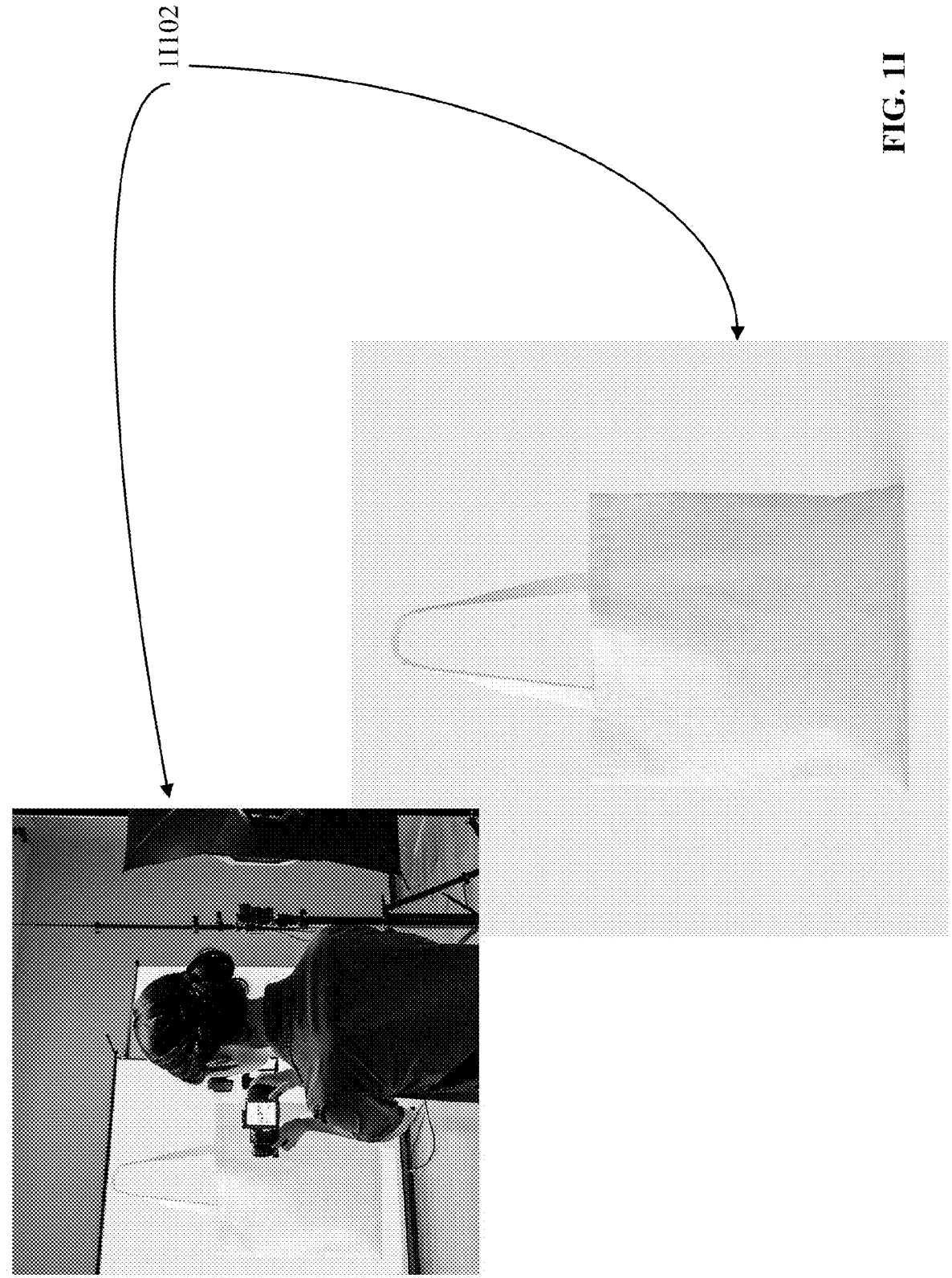
FIG. 1I is an example of obtaining a base image.

FIG. 1I is an example of obtaining a base image. In this example, process 1I102 includes preparing a display of a custom product (here a physical tote), setting up the light sources, determining an ambient light, and other lighting conditions that are useful and favorable for depicting the product. In the depicted example, a photographer takes a picture of the tote displayed on a white-background screen. The scene is illuminated using several light sources. The light is also reflected from screen panels and the like.

Another method for obtaining a base image of a custom product may also be implemented. For example, a base image may be a synthetic image, a digital 3D model, and the like.

6. Generating Synthetic Backgrounds/Images Using AI 6.1. Requests

Figure 2A:
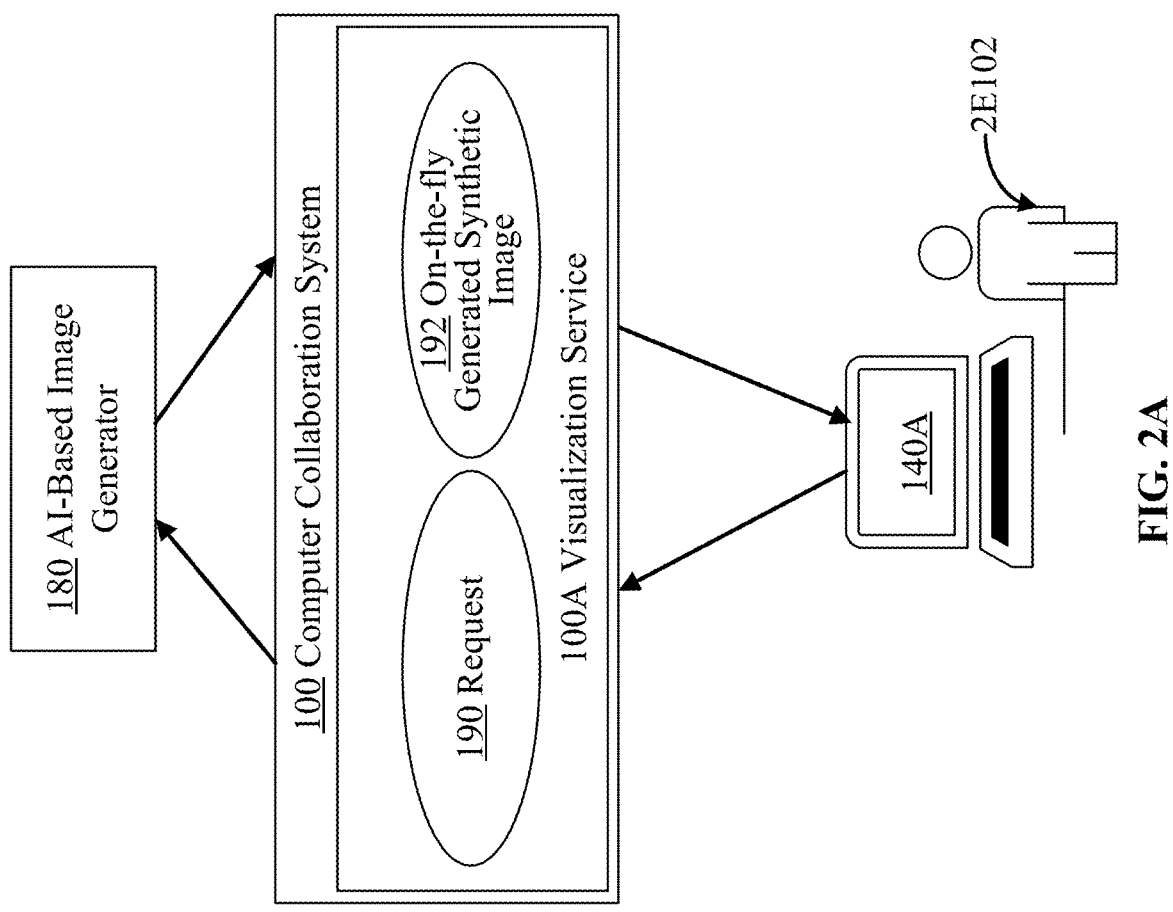
FIG. 2A is an example of utilizing an AI-based image generation approach.

FIG. 2A is an example of utilizing an AI-based image generation approach. In the depicted example, synthetic backgrounds and images may be generated as a product of collaboration between computer collaboration system 100, AI-based image generator 180, a user 2E102 operating a user computer 140A.

In some embodiments, computer collaboration system 100 uses its visualization service 100A to communicate with AI-based image generator 180.

User computer 140A may be used to receive customization requests from user 2E102, selections of custom products, and other requests to computer collaboration system 100. User computer 140A may also be used to display graphical visualization of custom products, including the visualization of on-the-fly generated AI-based images that have been merged with, or incorporated into, the visualization of the custom products.

Computer collaboration system 100 (or its visualization service 100A) may receive a graphical representation of a custom digital product, such as a pottery product, a linen product, a card, a print, a drawing, and the like. The graphical representation for a product may include encoded information about the product, and the product description-including the key-value pairs described later.

In some embodiments, a graphical representation of the custom digital product comprises product description data for a custom digital product. The product description data comprise a plurality of parameters of the custom digital product, and each parameter, of the plurality of parameters of the custom product, is a key-value pair. A key-value pair is a data structure that includes an attribute key and a corresponding attribute value.

Based on the received product description, as well as the user's profile, events, and the like, visualization service 100A determines one or more regions within the depiction of the custom product. The regions will be customized when displaying the graphical representation of the custom digital product on a display device.

A region may be determined based on the information included in the graphical representation of the product, the key-value pairs, a user's profile, and the like. The regions may include the background to be shown behind a depiction of the product, or other regions to be shown behind a depiction (or depictions) of the product or within the depiction of the product. For example, if a product is a Christmas card, then a region may be a background region displayed behind a depiction of the customized Christmas card. According to another example, if a product is an invitation card, then one region may be a region that is to be displayed above a depiction of the invitation card, while another region may be a region that is to be displayed on the invitation card itself.

For each region, visualization service 100A determines a set of keywords/phrases that are specific to the custom digital product and to the customization of the custom digital product. The set of phrases may include one or more key-value pairs extracted from the product description data. The set of phrases may also include one or more pieces of information extracted from a user profile of a user who customized the custom digital product. The set of phrases may further include one or more pieces of information extracted from a repository of events associated with the custom digital product. Various ways of deriving the keywords/phrases were described before.

For each region, the corresponding keywords/phrases are used to create a request 190.

A request may be a textual request and may pertain to the particular region for which the request has been created. The request is also referred to as a synthetic image generation request. It is possible to generate several requests for one region.

All the requests are transmitted by visualization service 100A to an AI-based image generator.

AI-Based Image Generator

AI-based image generator 180 is configured to receive requests for synthetic (or synthesized) images, generate synthetic/synthesized images in response to receiving the requests, and provide the generated synthetic/synthesized images to visualization service 200A.

Figure 2B:
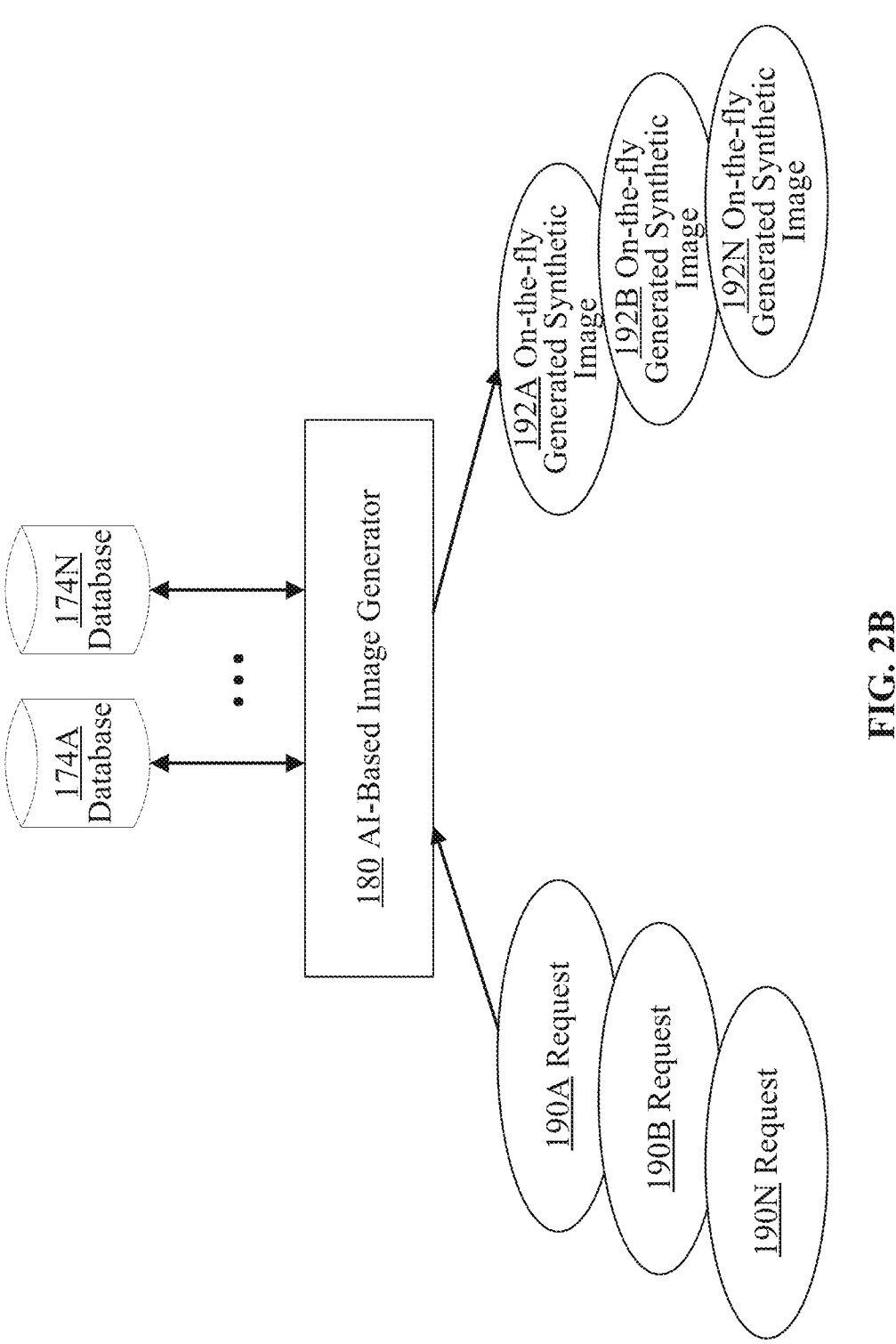
FIG. 2B is an example of an AI input and a corresponding AI output to be merged with a customized image.

FIG. 2B is an example of an AI input and a corresponding AI output to be merged with a customized image. For a given customization image, AI-based image generator 180 may receive a plurality of requests 190A, 190B . . . 190N. The requests may pertain to one individual region within the customization image; however, it is also possible that a plurality of requests is received for one individual region within the customized image.

AI-based image generator 180 may be configured to access one or more databases, such as database 174A, database 17, and so forth. A database may store SD-related files, a repository images, training data, training models, learning models, and the like.

In response to receiving requests 190A-190N, AI-based image generator 180 may generate one or more on-the-fly generated synthetic images 190A-190N.

6.3. Synthetic Images

Synthetic images may be generated based on the key-words/phrases included in the corresponding request. For each request, one or more synthetic images may be generated. As described before, each on-the-fly synthetic image is generated/synthesized from one or more images that have been retrieved from database(s) 174 and synthesized. Therefore, none of the synthetic images 190 looks like any of the images stored in the repository.

For each request 190, upon receiving the request, AI-based image generator 180 generates a customized synthetic image based on, at least in part, the request and a repository of images, as described earlier. The customized synthetic image is not a copy of any image from the repository of images. Instead, the customized synthetic image is generated by synthesizing a set of images that an AI-based image generator selected from the repository of images and by synthesizing the selected images using the SD approach, described earlier.

A customized synthetic image may be generated by synthesizing two or more images extracted from the repository of images that are tagged with phrases matching one or more phrases in the set of phrases. The images in the repository of images may be tagged using corresponding tags. The customized synthetic image is generated contemporaneously by updating a display of the custom digital product on the display device. That is why they are referred to on-the-fly generated synthetic, or synthesized, images.

Referring again to FIG. 2A, once the customized synthetic images are generated by AI-based image generator 180, the generator transmits the images to the computer collaboration system 100 and the virtualization service stores the images as on-the-fly generated synthetic images 192.

Upon receiving on-the-fly generated synthetic images 192, visualization service 100A matches the received images with the corresponding regions, includes the images in the corresponding regions, and generates a graphical visualization of the customized product and the corresponding synthetic images.

Then, visualization service 100A displays, on the display device, the graphical visualization of the custom digital product along with the customized synthetic images in the corresponding regions.

The graphical visualization along with the graphical representation of the custom digital product may be transmitted, or otherwise provided, to a manufacturing product rendering unit of a manufacturing entity. The manufacturing product rendering unit may render the graphical visualization and representation of the custom digital product, and, for example, print, using printing instructions of a manufacturing product rendering unit, the graphical representation of the custom digital product to generate a physical representation of the custom digital product.

7. Example Manufacturing System

In some embodiments, an approach for using a product as a key for context-based image generation of high-quality rendering and generating manufacturing output of custom products is implemented in a product collaboration platform. The platform allows users, designers, customers, and support engineers to, for example, design and create digital designs of products. An example computing environment for the process of creating digital designs, manufacturing products, and the like is described later in FIG. 3A.

7.1. Structural Description of Authoring Tools

In some implementations, a product visualization platform is configured to execute one or more software applications designed to generate high-quality renderings and manufacturing outputs of custom products. Generating high-quality renderings and the outputs may include performing several visualization tasks and production tasks. The tasks may be performed by executing the software applications as a set of sequential and/or parallel processes. As will be explained later, the applications are also referred to as authoring applications or authoring tools.

The authoring tools may receive, as input, an initial description of a product that is to be displayed by the platform and then made available for customization. From the initial description, the tools may generate layouts, or manufacturing files, that include a high-level representation of how the product is to be made or embellished and what customizable parts the product has. The layouts and manufacturing files are described later.

Manufacturing files may also include, for example, mark-ups, and the files with markups may be sent to a manufacturer. A markup may be a two-color checkerboard pattern comprising a plurality of squares, where each square is of a single color and each adjacent square is of an opposite color. For example, a markup may be a two-color checkerboard pattern comprising solid-colored squares, where each square is of a single color and each adjacent square is of the opposite color. A markup portion of an input image may be partitioned into a set of regions, where each region of the set of regions represents a single corresponding square of the markup. In other embodiments, the markups may include different patterns, shapes, or color(s). The markups have been disclosed in, for example, U.S. Pat. Nos. 9,852,533 B2 and 10,283,165 B2.

In response to sending the manufacturing files for a product to a manufacturer, the manufacturer may generate a physical product containing the markups and may send the physical product to the platform's operators.

Upon receiving the physical product with the markups, the platform's operators may take, using for example digital cameras, a set of high-quality photographs depicting the physical product and the corresponding markups. The photographs are then provided as input to the authoring tools executing on the platform. For example, the photographs containing the markups may be provided as input for generating, for example, various views of the product, and depicting the product having different finishes, different patterns, different colors, different shadings, and the like.

In some implementations, the visualization platform uses various views (e.g., configurable images, layouts, and design views (described later)) to depict the product and to allow generating output, which then can be, for example, displayed on the website generated by the visualization platform and made available to customers for personalization, customization and potentially purchasing. Different views are described later.

Various depth maps and laser-based imagery may also be used. Examples of devices that capture information about a product's physical appearance or construction may include cameras, scanning devices (such as lasers scanners, iPhones (Time Of Flight imaging), Kinects (structured infrared light pattern), and the like. Depth maps (generated using, for example, Microsoft's Kinect hardware and laser scanners may be used as scanning devices in testing and asset production. In the context of this disclosure, they operate similarly to, for example, a camera. They may be configured to capture the product's physical attributes or surface characteristics. The depth maps and laser scans may then be used in asset generation in the authoring tool.

If a customer finishes customizing a product and, for example, places an order for the product, then the data describing the customized product may be transmitted to, for example, a print server. The print server may use the data to generate a manufacturing output file. The output file may contain manufacturing instructions, which a manufacturer may use to manufacture the customized product as ordered by the customer. The manufacturing instructions are described later.

7.2. Designing an Asset

In some implementations, a product visualization platform is configured to execute software applications designed to generate high-quality renderings and manufacturing outputs of custom products. The high-quality renderings may be used to, for example, generate depictions of various products and the products' components. The products are also referred to herein as assets. The assets may be displayed on a website or other service where a user may interact with digital files featuring the assets and facilitating the personalization, customization, and ordering of the product by customers. The customizing of the products may involve, for example, employing high-quality renderings to be able to display the products using functionalities of the website or the chosen display service.

However, before a high-quality rendering of an asset may be generated, the asset needs to be designed and then a test needs to be performed to determine whether a manufacturer can manufacture a physical product corresponding to the asset according to the designer's specifications.

7.3. Asset Definition Data

Asset definition data is the data that parametrically describes an asset and/or a customized product. In some implementations, the asset definition data includes the Product Description Key-Values as disclosed in, for example, U.S. patent application Ser. No. 17/458,116, U.S. patent application Ser. No. 17/501,513, U.S. patent application Ser. No. 17/387,154, U.S. patent application Ser. No. 17/384, 636, U.S. patent application Ser. No. 17/501,451, U.S. patent application Ser. No. 16/867,898, and U.S. Pat. No. 11,080,912.

In addition to the Product Description Key-Values, manufacturing constraints may also be used. The manufacturing constraints may be used to set forth the metes and bounds for the equipment employed by the manufacturers involved in producing the products. The manufacturing instructions are usually compatible with the configurations of, for example, manufacturing servers, such as print servers, that process the manufacturing instructions and generate outputs that meet the requirements of the customer settings.

Manufacturing instructions usually capture all the information that needs to be provided to a manufacturer so that the manufacturer can produce/manufacture a product that was customized by a user and/or a designer. The manufacturing instructions capture the key-value pairs (described in detail later) in a form that is understandable by the equipment deployed by the manufacturer. As it will be described later, two or more customized products may have their own individual sets of key-value pairs; however, not all, but some of the key-value pairs in the corresponding individual sets of the key-value pairs may be the same. For example, a collection of coffee mugs having a particular floral design imprinted on the mugs of the collection may share or have similar, subsets of the key-value pairs that capture the details of the particular floral design.

Certain details of a group of certain customized products may be captured by a subset of the key-value pairs that may be specific to each and every certain customized product. That subset of the key-value pairs may be included in, a so-called, dictionary and labeled as reusable key-value pairs. The dictionary may be stored in a storage or a memory unit by, for example, a product customization platform, which is described later.

Similarly, one or more certain manufacturing constraints of a plurality of manufacturing constraints for manufacturing a group of certain customized products may be specific to each and every certain customized product. One or more certain manufacturing constraints may be included in the dictionary and labeled as reusable manufacturing constraints.

Realistically, during conversations with a manufacturer, it might be difficult to describe the necessary manufacturing constraints in the way that a product that the manufacturer manufactured would match the customized product (described using the key-value pairs). Therefore, there is a need to use the dictionary with the labeled particular manufacturing instructions (corresponding to a subset of the certain key-value pairs), and then select a short list of the manufacturing instructions, selected from the labeled particular manufacturing instructions, and use them as a starting point to capture the characteristics of the customized product. Then the manufacturing instructions from the shortlist may be refined and further fine-tuned until the accurately manufactured product can be produced.

7.4. User Devices

Figure 3A:
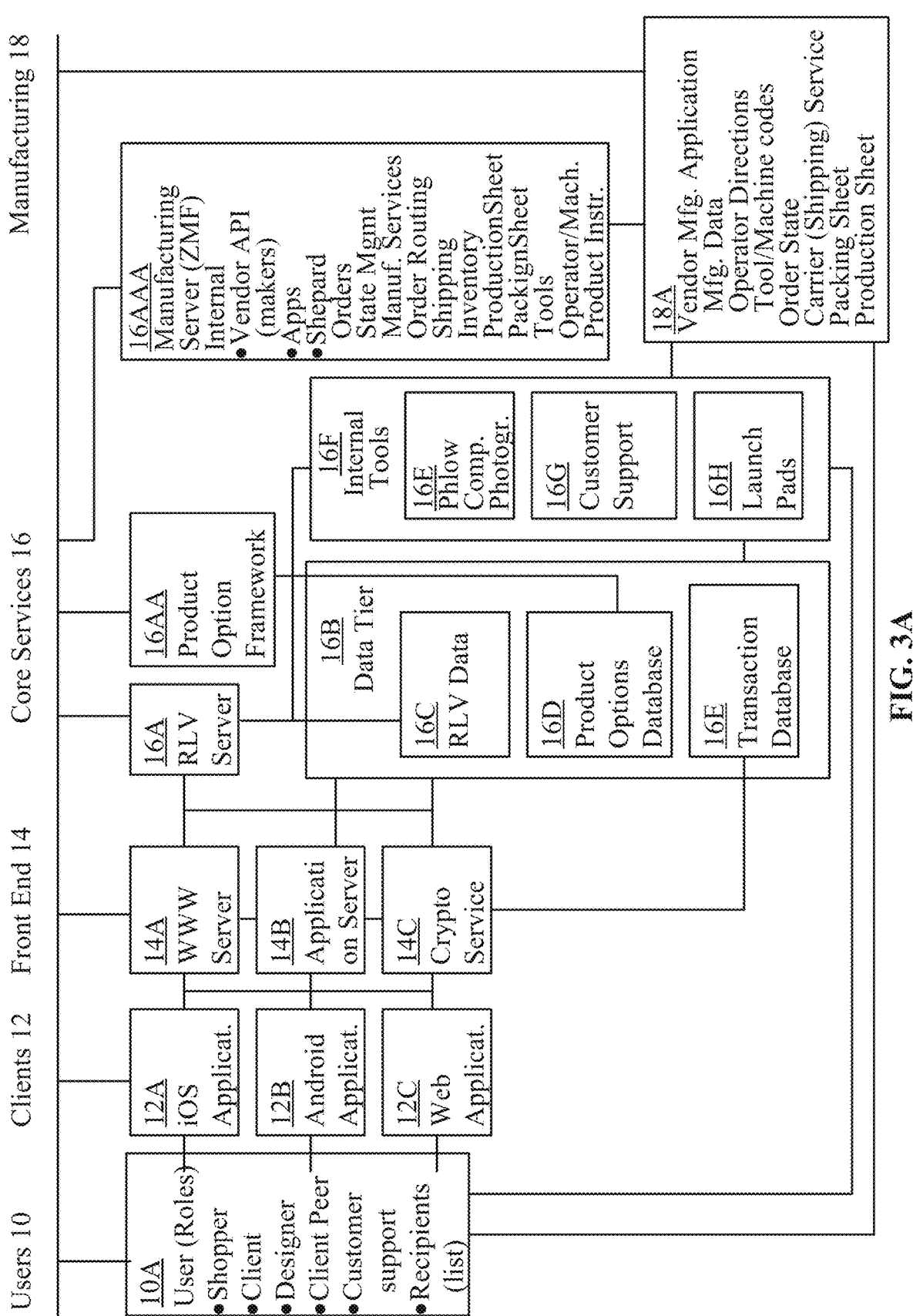
FIG. 3A is a block diagram showing an example environment for designing and manufacturing products.

FIG. 3A is a block diagram showing an example environment for designing and manufacturing products. FIG. 3A depicts several examples of users 10. Each of the users 10 may use its own, or shared, computer device. Examples of user devices are described later in FIG. 3B (see devices 140A-G).

In some embodiments, examples of user 10 are determined based on the roles that may be assigned to the users.

Examples 10A of roles may include a shopper, a client, a designer, a client peer, a customer support engineer, a recipient, and the like.

7.5. Client Applications

Clients 12 in FIG. 3A refer to client applications that are implemented in client servers 14 and that are configured to support requests received from users 10A. Non-limiting examples of clients 12 may include iOS applications 12A, Android applications 12B, Web applications 12C, and the like.

7.6. Frontend Servers

Frontend servers 14 refer to computer-based servers that are configured to process requests received from clients 12 and in many cases interact with core services 16 to further resolve these requests. Examples of frontend servers 14 include one or more WWW servers 14A one or more application servers 14B, and one or more cryptographic servers 14C. Cryptographic servers 14C may be configured to provide cryptographic services for encrypting/decrypting, transmitting, or otherwise communicating data between the entities depicted in FIG. 3A.

7.7. Core Services

Core services 16 in FIG. 3A refer to servers and services implemented in a role-based collaboration platform configured to provide functionalities for creating and designing digital designs, handle collaboration requests, and facilitate the customization requests received from users 10.

In some embodiments, a customization process performed by a user, of users 10, and intended to generate a digital design of a customized product is captured in so-called product description data, which then may be translated into a manufacturing description comprising product and manufacturing instructions.

The product and manufacturing instructions may include digital design specifications, data, and code needed to manufacture a custom product. That may include instructions for generating, for example, a 3D geometry for digital final products. This may also include generating instructions for generating 2D and/or 3D patterns that may be used to cut, cast, or form physical components of physical final products. The patterns may be parametric, i.e., they may have parameters that, through encoded relationships, adjust the form of the pattern for a specific need.

For instance, a set of 2D patterns for a t-shirt graded based on size may become a parametric pattern by interpolating grade curvatures. A single parametric value may set this automatic grading. The single parametric value is usually called a 'size.'

The product instructions may also include models, including 2D and 3D models that are used to form, through additive manufacturing, or subtractive manufacturing, portions of a product. The models may be parametric, i.e., they may have parameters that, through coded relationships, adjust the form of the model for a specific need. For instance, a set of 3D models may represent a bike helmet. Each model may fit a statistically normed human head of a specific age. A coded relationship between the models may allow for interpolation of the set of models for a specific age. A single parametric value may set the automatic interpolation. The single parametric value in this case is usually called an 'age.'

The product instructions may also include material properties such as a physical material used to form a product from a pattern. Some material properties may be parametric, i.e., they may be selected or changed during the manufacturing time.

The properties may also include a body color. For instance, the color of a fabric may be selected for manufacturing a t-shirt. According to another example, the color of plastic may be selected for manufacturing a bike helmet.

The properties may also include a body texture such as the fabric weave of a t-shirt may be specified to be smooth or stubby. For instance, the surface of a plastic bike helmet may be polished or satin. Each property is necessarily specific to each class of materials. Examples of materials and properties may include a fabric (such as a weave or knit type, a fiber type (cotton, wool, flax, polyester, polypropylene), a thread size, a thread count, a color, an integral design (kit, knit, tapestry), a bolt width, a selvage type, a surface (hand), and the like.

The properties may also include plastics, which may include sub-properties such as color, surface quality (a bidirectional luminance function), melting point, impact resistance, a forming method (thermoplastic, cast), a type (acrylic, polypropylene, etc.), and the like.

The properties may also include metals, which may include sub-properties such as a type (aluminum, steel, copper, brass, etc.), a color, a surface quality (e.g., a bidirectional luminance function), a melting point, a tensile strength, a shear strength, toxicity, and the like.

The properties may also include non-woven specified by a type (paper, felt, Tyvek, etc.), a color, a surface quality (e.g., a bidirectional luminance function), a surface type (hot pressed, natural, textured, etc.), a weight per square meter, an acid content, a compatible media, coating, and the like.

The properties may also include metamaterials which may be described as a combination of multiple materials created during a manufacturing process. For instance, during a fused deposition manufacture, plastics with a variety of properties may be mixed to provide a physical product with gradations of flexibility, durometer, and the like. According to another example, during the laser sintering of metals, a mix of metal alloys with a variety of properties may be deposited, resulting in a product composed of gradations of metallic properties. According to yet another example, during high-resolution UV-printing, layers of the UV-cured material with different refractive indices may be deposited, resulting in a large variety of optical effects.

The properties may also include embellishment such as a trim-color, designs, and applied ornaments. The trim colors may indicate the color of the edging around the sleeve of a t-shirt, the color of the trim around the base of a bike helmet, and the like.

The designs may indicate a custom printed front of a t-shirt, a custom thermal printed design to the side of a bike helmet, and the like.

The applied ornaments may indicate rhinestones on a t-shirt, holographic spangles on a bike helmet, and the like.

Some properties may apply to a large class of products and may allow for a limited set of properties to be transferred from one product to another. Other properties may be specific to a particular product or manufacturing method.

It may be appreciated that much of the novel art of the system and method is in enumerating the constraints imposed by manufacturing a specific custom product and crafting these constraints as a set of product option key-value pairs. These manufacturing constraints are propagated through the entire system and method, and by using these product option key-values, allowing for the manufacturing of a series of custom products that meet these physical constraints.

Referring again to FIG. 3A, in some embodiments, core services 16 refer to services implemented in a role-based collaboration platform. In the depicted example, core services 16 may be provided by one or more real-view (RLV) servers 16A and a product option framework 16AA. Both RLV servers 16A and product option framework 16AA may use one or more data tier databases 16B, including RLV Data 16C, a product options database 16D, a transaction database 16E, and the like.

In some embodiments, core services 16 may also utilize internal tools 16F, such as a "Phlow" computational photographical tools 16E, a customer support tools 16G, a launch pads tools 16H, and the like.

Product option framework 16AA is also referred to as a persistent design data framework. The framework data may include a product option set, which may include a set of product options pertaining to a specific product type. It usually contains the product instructions (e.g., collaboration components 106 in FIG. 2) for manufacturing, or producing, the product.

In some embodiments, product option framework 16AA is configured to provide services for transforming ProductOption key-value pairs (i.e., manufacturing constraints) from one product to the other. Transforming the ProductOption key-value pairs from one product to another may require, for example, transforming the color space (i.e., sRGB to CMYK US Web Coated (SWOP) v2), transforming an image from raster to vector, and/or resizing the image for the fit.

Figure 3B:
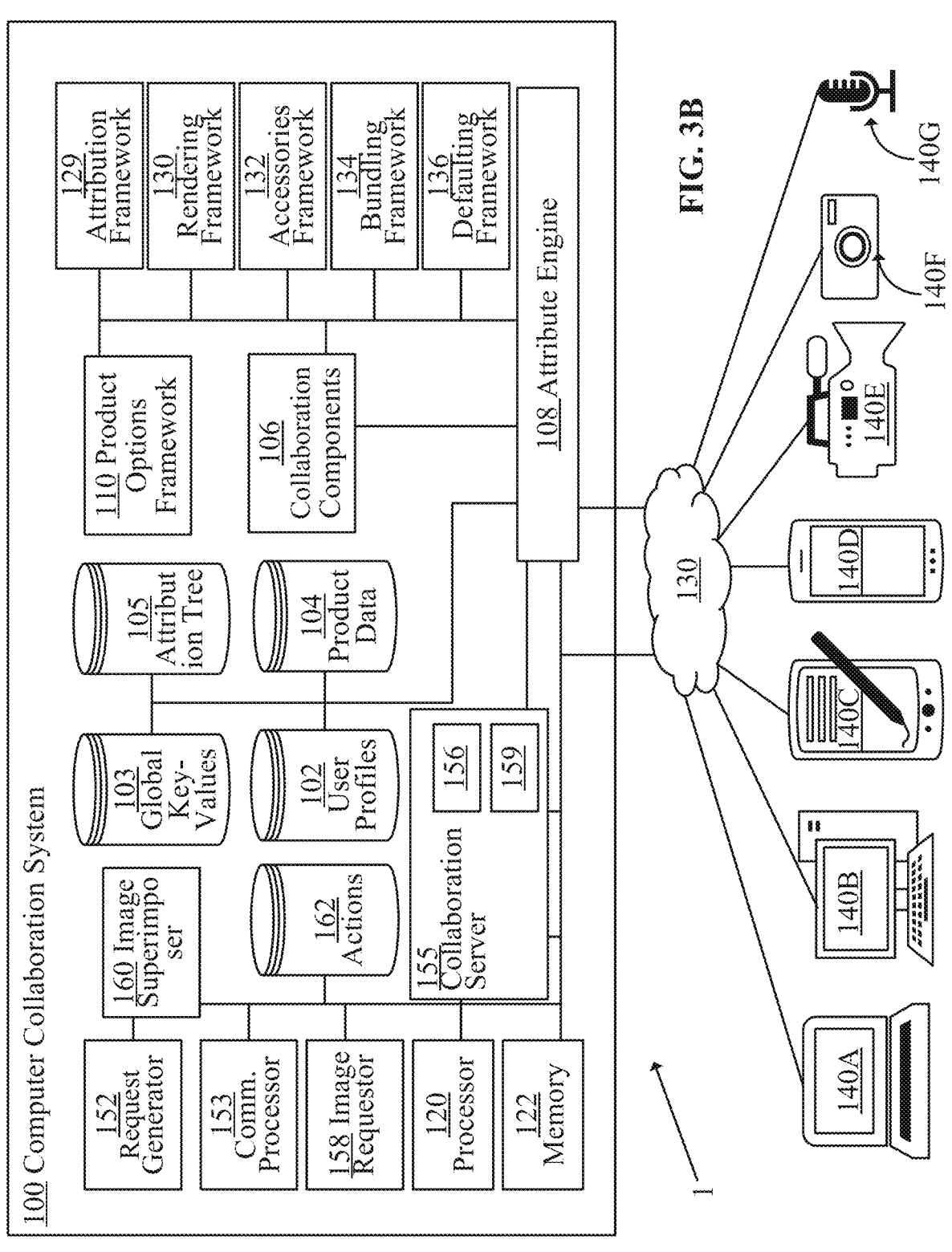
FIG. 3B is a block diagram showing an example of a role-based collaboration platform.

An example use case of the product option framework is described in detail in FIG. 3B.

In some embodiments, there are two basic types of product instructions (1) fixed (that include the instructions for the product which are fixed and not customized), and (2) custom (that contain the logic to transform a user interface parameter into a product instruction).

In some embodiments, the product option set contains the logic to enumerate each customizable option in a manner that presents a complete user interface to change the parametric product instructions.

The instructions for manufacturing a customized product are usually parametric. The parameters include the size of the customized product (this can be multi-dimensional, and include width, height, depth, and the like). The parameters may also relate to human sizes or age. The parameters may also be custom and based on biometric information.

The parameters may also include a component body color, a component body texture, a trim body color, a trim body texture, a design area, and the like.

In some embodiments, a product option may be represented as a key-value pair. The key-value pair is a label that may span individual products and represent a class of products. The keys of pairs may include a material type, a color, a size, and the like.

The value in a key-value pair is a specific discrete or continuous value that sets a manufacturing instruction. Examples of discrete (enumerated) values may include a discrete type of fabric such as cotton, cotton-polyester blend, silk, and the like. The discrete values may also include specific colors, such as white, navy, black, and the like.

Examples of continuous values of key-value pairs may include a single element, such as a length or a ribbon, a vector, such as a size of a frame for a print (width (in inches)) or a height (in inches)), or the size of a box for the European countries, such as a size of a box for the EU (width (in millimeters), height (in millimeters), depth (in millimeters)).

The values may also reference a known file type, such as an image for the design on a t-shirt, such as an embroidery file for the back of a jacket, such as an engraving design for a bracelet, and the like.

In some embodiments, values in key-value pairs may include a set of graphic primitives for a design, such as an image, a line, a circle, a rectangle, a text, a group, and the like.

The product option key-values may have default values. Default values are pre-set values that will produce a product without changing any key-value pairs through customization. When key-values are changed they may produce a product option framework event chain. A product option framework event chain is a journal of each key-value change ordered in time.

A product type may itself be represented by a product option key-value. Using this option type, one product type may be associated with another product type through a well-known relationship.

In some embodiments, a product option framework event chain includes one or more products, and the chain may represent or memorialize an event. The products may represent or memorialize an event. Examples of events may include weddings, birthdays, anniversaries, graduations, national holidays, reunions, and the like.

Many products fit into an event chain. For example, the products that fit into a wedding event may include the following products: save the date products, invitations, RSVPs, bachelor party invite products, bachelorette party invite products, party favors products, gift registry cards, place cards, napkins, wedding programs, wedding gifts, thank-you cards, wedding keepsake photos, and the like.

Examples of products that may fit into a birthday event may include the following products: invitations, RSVPs, party bags, party keepsake photos, and the like.

In some embodiments, in a product option set event chain, a key-value pair encodes the next product in the chain. For example, an invitation may be chained to an RSVP card. A key-value may also encode the role for the chained event. For example, a chained RSVP card key-value may further include a recipient of the invitation as the sender role for the RSVP card.

A key-value pair may also encode the shared properties used to set the chained product's properties. For instance, a design for the invitation may be shared with the RSVP card. A key-value may also encode the timing for the chained product. Typically, the event chain properties are custom (parametric), and they may be changed by a product designer to fit a specific product set.

In an embodiment, a product option framework is configured to generate a product option framework user interface. Accordingly, each product option set is associated with logic and code to build a user interface element for each parametric product option. Furthermore, each product options set contains style hints so that each user interface element may be artfully placed to produce a high-quality user experience.

Typically, user interface elements are designed to match each class of values found in all products covered by a product option framework. New user interface elements may be added as the product categories expand. The user interface elements may include a design view, a color editor, a font editor, a size selector, a texture selector, a text editor, a fabric swatch selector, a product configurable image, and the like.

In some embodiments, a product options framework cooperates with a user product renderer that may be implemented in, for example, a RealView server 16A. The user product renderer may be configured to render views of a custom product as though it is already manufactured. Typically, it uses a product option set of key-values as input. It creates one or more run-time assets using computational photography of the manufactured product.

7.8. Example Manufacturing System

Referring again to FIG. 3A, manufacturing instructions may be communicated from core services 16 to manufacturing 18, which may include one or more manufacturing servers 16AAA. Servers 16AAA may receive the manufacturing instructions, process the instructions, and communicate with a vendor manufacturing application 18A to generate, for example, manufacturing data, operator directions, tool/machine codes, and the like. The application may also generate information about an order state, a packing slip, a production sheet, and the like. Some of that information may be communicated to a carrier (shipping) service selected to deliver the final products to the recipients.

A final product may be manufactured using markups. A markup for, for example, a body color of a product may be made by specifying a distinct and separate color for Body-Color key-value. A markup for the trim color of a product may be made by specifying a distinct and separate color for, for example, a TrimColor key-value pair. A markup for a design area of a product may be made by specifying a specific marker type (e.g., a removable linear markup, a digital markup, or a digital field markup) for a design-area image.

Construction of a so-called Product RealView geometry may be performed using computational photographic techniques. For example, a BodyColor area of a surface may be recognized and layered as a custom computer graphics shader for rendering light, color, and texture. Each TrimColor area's surface may be recognized and layered as a custom computer graphics shader for rendering light, color, and texture. Rendering of the Product RealView may be performed by setting its product option key-values and shading each of its constructed layers.

7.9. Example Manufacturing Process

As described above, a manufacturing process may pertain to manufacturing a digital product as well as manufacturing a physical product. Since the manufacturing instructions for generating a product are generated based on a plurality of key-value pairs for a digital design of the product, in some situations, the same manufacturing instructions may be used to manufacture the digital product as well as to manufacture the physical product.

In some embodiments, a product options framework builds an interface for a key called OutputStyle. The interface for the OutputStyle key may allow a designer (or any other collaborator) to select values for the media for the presentation of an interactive design. The choices may include a JPEG_Image, a GIF_Image, and an H264_Video.

If a designer chooses the GIF_Image option, then the product options framework may send the instructions to the manufacturing system to traverse each of the key values in the KeyValueJournal, and for each key, and use a User Product Renderer to render the state of the custom physical product with that modification as images in the sRGB 32-bit RGBA format. Subsequently, the manufacturing system may store the renderings in a local image cache.

Then, the manufacturing system may traverse the images stored in the local image cache and determine an optimal color palette for that collection of images.

Subsequently, the manufacturing system may convert the images in the local image cache from 32-bit RGBA format to 8-bit Indexed color.

Then, the manufacturing system may embed a digital watermark that encodes the input KeyValueJournal's UUID in the 8-bit indexed color image cache.

Next, the manufacturing system may begin encoding the image file. For example, the manufacturing system may write the header bytes; write the Logical Screen Descriptor bytes; write the found color palette as a gif Global Color Table; write the gif 8 bit character application name; and embed metadata as a comment (or a watermark) which encodes the input KeyValueJournal's UUID.

Next, the manufacturing system sets a FrameCount to one and proceeds to process each frame in the image file. The processing includes checking if there is an image in the 8 bit indexed color image cache; and if so, then the manufacturing system continues; otherwise, the manufacturing system proceeds to taking the next image.

To continue, the manufacturing system writes the gif Graphic Control Description for the FrameCount, and then processes the first 8-bit indexed color image cache into blocks of 255 LZW compressed bytes.

Next, the manufacturing system writes the compressed bytes and removes the first image from the 8-bit indexed color image cache. Then, the manufacturing system increments the FrameCount and repeats the process for the next frame.

Once the manufacturing system processes all frames, the manufacturing system writes the file terminator (such as an ASCII code for zero) to the image file and outputs the manufactured GIF product.

At this point, executing the manufacturing instructions for the purpose of manufacturing the product ends, and the manufacturing of the product is completed.

8. Example Product Collaboration Platform

In some embodiments, the approach presented herein is implemented in one or more computer systems that host a product collaboration platform. Alternatively, the approach may be implemented in one or more computer systems that communicate with the collaboration platform but that do not actually host the platform itself. For the clarity of the description, it is assumed that the computer environment supporting the approach presented herein is implemented in the product collaboration platform.

FIG. 3B is a block diagram showing an example of a role-based collaboration platform. In the example depicted in FIG. 3B, a computer collaboration system 100 includes a user profiles database 102, a global-key-values database 103, a product data definitions database 104, an attribution trees database 105, collaboration components 106, a product options framework 110, an attribute engine 108, one or more processors 120, one or more memory units 122, and one or more frameworks 129-136.

Furthermore, computer collaboration system 100 includes a collaboration server 155 (including a monitoring system 156, and a request analyzer 159), one or more blacklist databases 163, one or more actions databases 162, a request generator 152, a communications processor 153, and an image requestor 158, and an image superimposer 160. Computer collaboration system 100 may communicate directly, or via one or more communications networks 130, with one or more user computers 140A-140G, all described in detail later.

Computer collaboration system 100 shown in FIG. 3B is provided herein to illustrate clear examples and should not be considered limiting in any way. Other computer collaboration systems may include additional components such as computer servers, various input/output devices, and additional software and/or hardware components. Other computer collaboration systems may be implemented in cloud-based systems, distributed computer networks, and the like. Other computer collaboration systems may include fewer components than example computer collaboration system 100 shown in FIG. 3B.

Certain components depicted in FIG. 3B are also described in U.S. patent application Ser. No. 18/120,402. The components such as request generator 152, image requestor 158 and image superimposer 160 were described above.

9. Example Flow Chart

Figure 4:
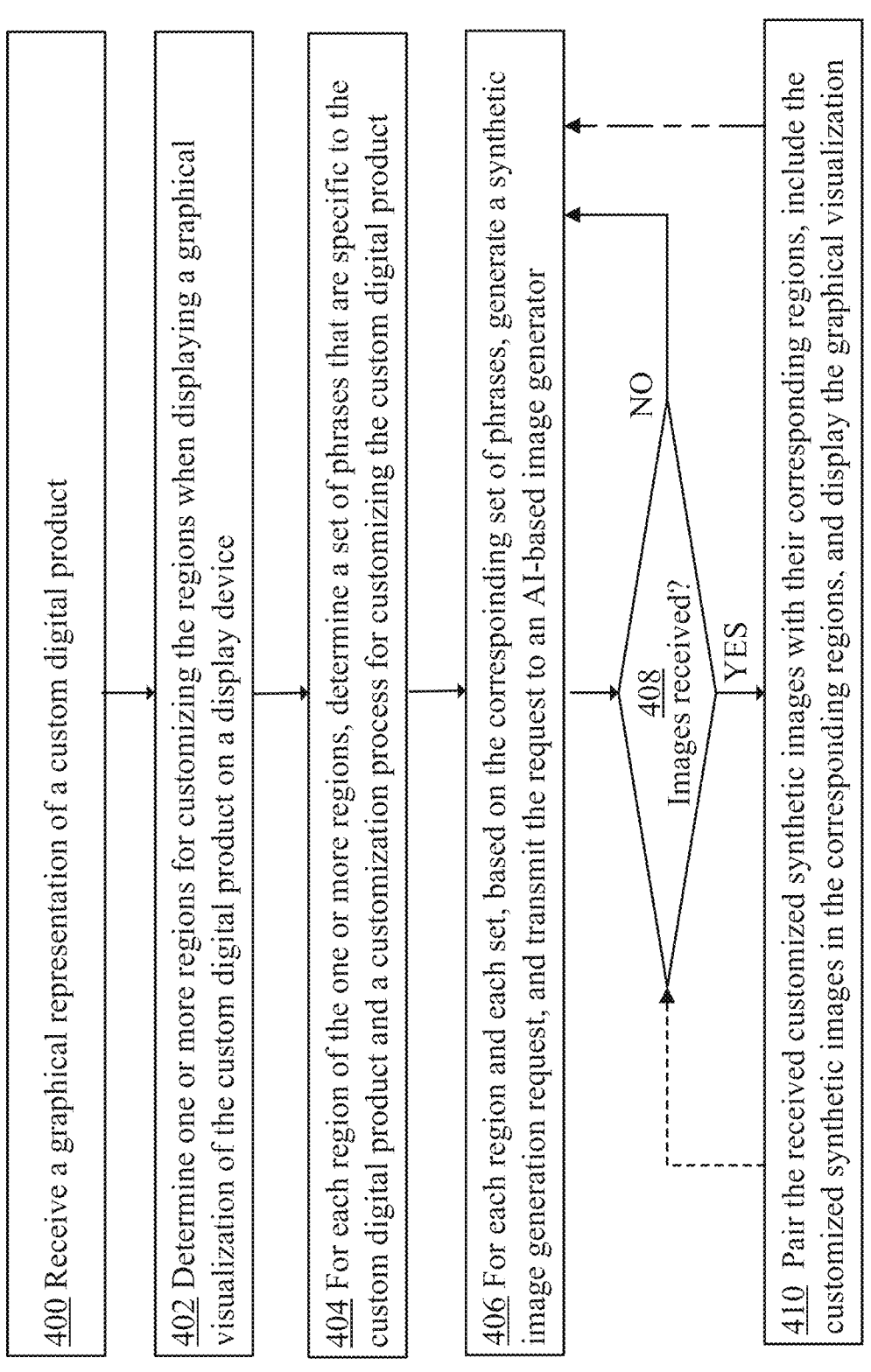
FIG. 4 is a flow chart depicting an example process for using a product as a key for context-based image generation.

FIG. 4 is a flow chart depicting an example process for using a product as a key for context-based image generation. The method may be performed by a computer collaboration system 100, or its visualization service 100A. Both, the computer collaboration system and the visualization service are configured to communicate with AI-based image generator 180 and to request and receive synthetic AI-based images. For simplicity of the description, it is assumed that the below steps are performed by the visualization service.

In step 400, a visualization service of a computer collaboration system receives a graphical representation of a custom digital product. A graphical representation of the custom digital product may be constructed using a series of rendering and compositing actions derived from product description data for custom digital product.

The compositing actions include manufacturing instructions. The product description data comprise a plurality of parameters of the custom digital product. Each parameter, of the plurality of parameters of the custom product, is a key-value pair. A key-value pair is a data structure that includes an attribute key and a corresponding attribute value.

In step 402, the visualization service determines one or more regions for customizing a region when displaying the graphical representation of the custom digital product on a display device.

In step 404, the visualization service, for each region of the one or more regions, determines a set of phrases that are specific to the custom digital product and a customization process for customizing the custom digital product.

A set of phrases comprises one or more key-value pairs extracted from the product description data. The set of phrases may also include one or more pieces of information extracted from a user profile of a user who customized the custom digital product. The set of phrases may also include one or more pieces of information extracted from a repository of events associated with the custom digital product.

In step 406, for each region and based on the corresponding set of phrases, the visualization service generates a synthetic image generation request. Also in this step, the visualization service transmits the synthetic image generation request to an artificial intelligence (AI) based image generator configured to generate synthetic images.

Transmitting the requests to the AI-based image generator causes the AI image generator to generate, for each region and each request for the region, a customized synthetic image based on, at least in part, the synthetic image generation request and a repository of images. None of the customized synthetic images is a copy of any image from the repository of images. Then, the AI image generator transmits the customized synthetic image to the computer collaboration system.

A customized synthetic image is generated by synthesizing two or more images extracted from the repository of images that are tagged with phrases matching one or more phrases in the set of phrases. Images in the repository of images are tagged using corresponding tags. The customized synthetic image is generated contemporaneously by updating a display of the custom digital product on the display device.

In step 408, the visualization service check if any of the synthetic images have been received from the AI image generator in response to the sent requests. If the images have been received, then the visualization service proceeds to step 410. Otherwise, the visualization service continues checking in step 406.

In step 410, the visualization service pairs the received customized synthetic images with their corresponding regions and includes the customized synthetic image in the corresponding region.

Also in this step, the visualization service causes displaying, on the display device, a graphical visualization of the custom digital product along with the customized synthetic images included in the corresponding regions.

In addition, if some of the expected customized synthetic images have not been received, the visualization service may either await such images in step 408, regenerate a request (or requests), or end the process.

10. Implementation Example

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
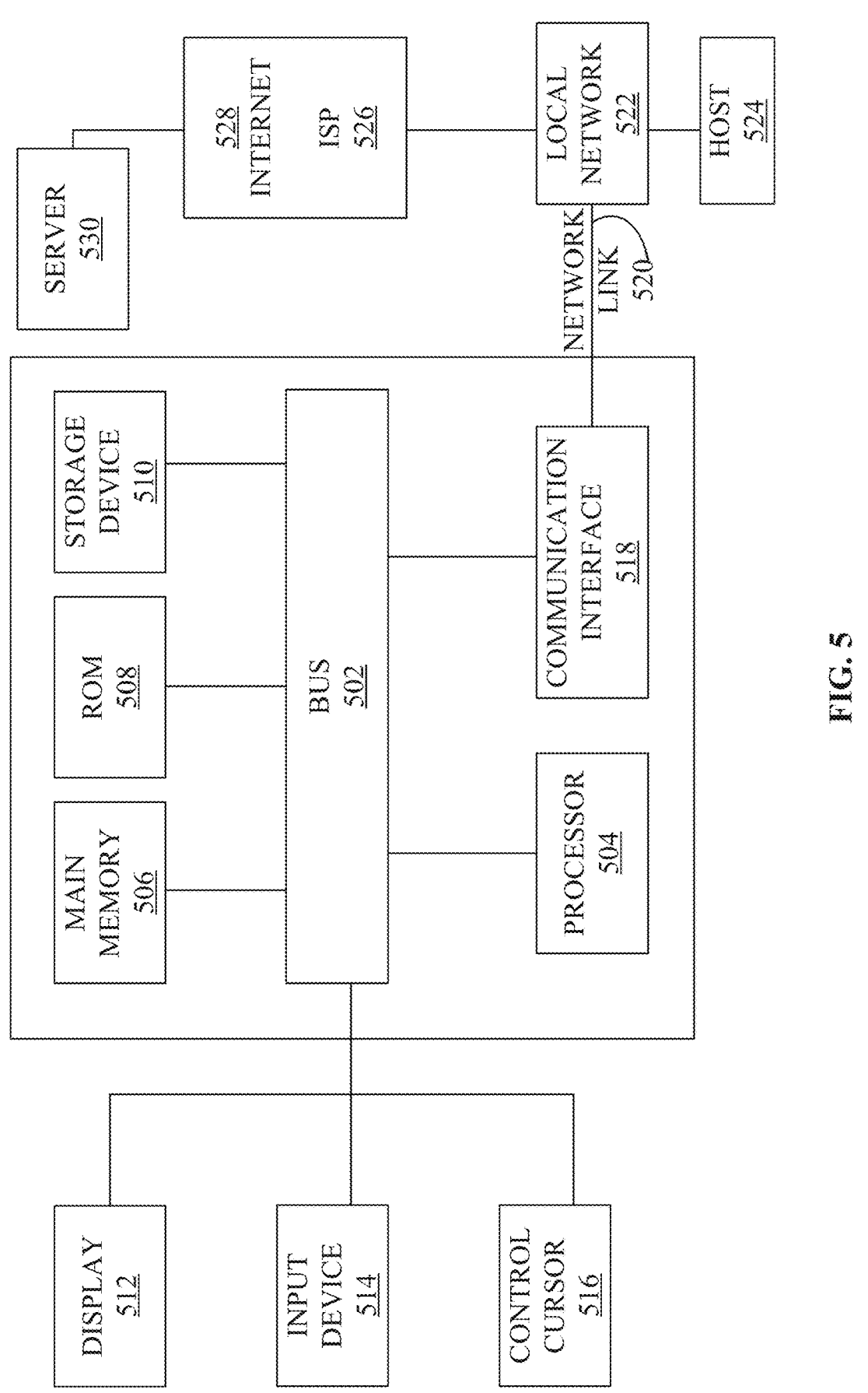
FIG. 5 is a block diagram that illustrates a computer system with which the techniques herein may be implemented.

FIG. 5 is a block diagram that depicts an example computer system 500 upon which embodiments may be implemented. Computer system 500 includes a bus 502 or other communication mechanism for communicating information, and a processor 504 coupled with bus 502 for processing information. Computer system 500 also includes a main memory 506, such as random-access memory (RAM) or another dynamic storage device, coupled to bus 502 for storing information and instructions to be executed by processor 504. Main memory 506 also may be used for storing temporary variables or other intermediate information during the execution of instructions to be executed by processor 504. Computer system 500 further includes a read-only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic, or computer software which, in combination with the computer system, causes or programs computer system 500 to be a special-purpose machine. According to one embodiment, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip, or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated service digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams.

Computer system 500 can send messages and receive data, including program code, through the network(s), network link 520, and communication interface 518. In the Internet example, server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issued from this application, in the specific form in which such claims are issued, including any subsequent correction. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method for using a custom product as a key for context-based image generation, the method comprising:
   receiving, by a visualization service of a computer collaboration system, a graphical representation of a custom digital product;
   determining, by the visualization service, one or more regions for customizing regions when displaying a graphical visualization of the custom digital product on a display device;

for a region of the one or more regions:

determining, by the visualization service, a set of phrases that are specific to the custom digital product and a customization process for customizing the custom digital product; wherein the set of phrases comprises one or more pieces of information extracted from a user profile of a user who customized the custom digital product;

based on the set of phrases, generating a synthetic image generation request;

transmitting the synthetic image generation request to an artificial intelligence (AI) based image generator configured to generate synthetic images;

causing the AI-based generator to:

generate a customized synthetic image based on, at least in part, the synthetic image generation request and a repository of images; wherein the customized synthetic image is not a copy of any image from the repository of images;

transmit the customized synthetic image to the computer collaboration system;

including the customized synthetic image in the region;

causing displaying, on the display device, the graphical visualization of the custom digital product along with the customized synthetic image in the region.

2. The method of claim 1, wherein the graphical representation of the custom digital product is constructed using a series of rendering and compositing actions derived from product description data for a custom digital product;

wherein the compositing actions include manufacturing instructions;

wherein the product description data comprise a plurality of parameters of the custom digital product;

wherein each parameter, of the plurality of parameters of the custom product, is a key-value pair;

wherein the key-value pair is a data structure that includes an attribute key and a corresponding attribute value.

3. The method of claim 2, wherein the set of phrases comprises one or more key-value pairs extracted from the product description data.

4. The method of claim 2, wherein the set of phrases comprises one or more pieces of information extracted from a repository of events associated with the custom digital product.

5. The method of claim 2, wherein the customized synthetic image is generated by synthesizing two or more images extracted from the repository of images that are tagged with phrases matching one or more phrases in the set of phrases;

wherein images in the repository of images are tagged using corresponding tags;

wherein the customized synthetic image is generated contemporaneously by updating a display of the custom digital product on the display device.

6. The method of claim 1, further comprising:

transmitting the graphical representation of the custom digital product to a manufacturing product rendering unit;

causing the manufacturing product rendering unit to:

render the graphical representation of the custom digital product;

print, using one or more printing instructions of a manufacturing product rendering unit, the graphical representation of the custom digital product to generate a physical representation of the custom digital product.

7. One or more non-transitory computer-readable media storing one or more instructions, which, when executed by one or more processors, cause the one or more processors to perform:

receiving, by a visualization service of a computer collaboration system, a graphical representation of a custom digital product;

determining, by the visualization service, one or more regions for customizing regions when displaying a graphical visualization of the custom digital product on a display device;

for a region of the one or more regions:

determining, by the visualization service, a set of phrases that are specific to the custom digital product and a customization process for customizing the custom digital product; wherein the set of phrases comprises one or more pieces of information extracted from a user profile of a user who customized the custom digital product;

based on the set of phrases, generating a synthetic image generation request;

transmitting the synthetic image generation request to an artificial intelligence (AI) based image generator configured to generate synthetic images;

causing the AI-based generator to:

generate a customized synthetic image based on, at least in part, the synthetic image generation request and a repository of images; wherein the customized synthetic image is not a copy of any image from the repository of images;

transmit the customized synthetic image to the computer collaboration system;

including the customized synthetic image in the region;

causing displaying, on the display device, the graphical visualization of the custom digital product along with the customized synthetic image in the region.

8. The one or more non-transitory computer-readable media of claim 7, wherein the graphical representation of the custom digital product is constructed using a series of rendering and compositing actions derived from product description data for a custom digital product;

wherein the compositing actions include manufacturing instructions;

wherein the product description data comprise a plurality of parameters of the custom digital product;

wherein each parameter, of the plurality of parameters of the custom product, is a key-value pair;

wherein the key-value pair is a data structure that includes an attribute key and a corresponding attribute value.

9. The one or more non-transitory computer-readable media of claim 8, wherein the set of phrases comprises one or more key-value pairs extracted from the product description data.

10. The one or more non-transitory computer-readable media of claim 8, wherein the set of phrases comprises one or more pieces of information extracted from a repository of events associated with the custom digital product.

11. The one or more non-transitory computer-readable media of claim 8, wherein the customized synthetic image is generated by synthesizing two or more images extracted from the repository of images that are tagged with phrases matching one or more phrases in the set of phrases;

wherein images in the repository of images are tagged using corresponding tags;

wherein the customized synthetic image is generated contemporaneously by updating a display of the custom digital product on the display device.

12. The one or more non-transitory computer-readable media of claim 8, further comprising:

transmitting the graphical representation of the custom digital product to a manufacturing product rendering unit;

causing the manufacturing product rendering unit to:

render the graphical representation of the custom digital product;

print, using one or more printing instructions of a manufacturing product rendering unit, the graphical representation of the custom digital product to generate a physical representation of the custom digital product.

13. A custom product computer system generator comprising:

a memory unit;

one or more processors; and a custom product computer storing one or more instructions, which, when executed by one or more processors, cause the one or more processors to perform:

receiving, by a visualization service of a computer collaboration system, a graphical representation of a custom digital product;

determining, by the visualization service, one or more regions for customizing regions when displaying a graphical visualization of the custom digital product on a display device;

for a region of the one or more regions:

determining, by the visualization service, a set of phrases that are specific to the custom digital product and a customization process for customizing the custom digital product; wherein the set of phrases comprises one or more pieces of information extracted from a user profile of a user who customized the custom digital product;

based on the set of phrases, generating a synthetic image generation request;

transmitting the synthetic image generation request to an artificial intelligence (AI) based image generator configured to generate synthetic images;

causing the AI-based generator to:

generate a customized synthetic image based on, at least in part, the synthetic image generation request and a repository of images; wherein the customized synthetic image is not a copy of any image from the repository of images;

transmit the customized synthetic image to the computer collaboration system;

including the customized synthetic image in the region;

causing displaying, on the display device, the graphical visualization of the custom digital product along with the customized synthetic image in the region.

14. The custom product computer system generator of claim 13, wherein the graphical representation of the custom digital product is constructed using a series of rendering and compositing actions derived from product description data for a custom digital product;

wherein the compositing actions include manufacturing instructions;

wherein the product description data comprise a plurality of parameters of the custom digital product;

wherein each parameter, of the plurality of parameters of the custom product, is a key-value pair;

wherein the key-value pair is a data structure that includes an attribute key and a corresponding attribute value.

15. The custom product computer system generator of claim 14, wherein the set of phrases comprises one or more key-value pairs extracted from the product description data.

16. The custom product computer system generator of claim 14, wherein the set of phrases comprises one or more pieces of information extracted from a repository of events associated with the custom digital product.

17. The custom product computer system generator of claim 14, wherein the customized synthetic image is generated by synthesizing two or more images extracted from the repository of images that are tagged with phrases matching one or more phrases in the set of phrases;

wherein images in the repository of images are tagged using corresponding tags;

wherein the customized synthetic image is generated contemporaneously by updating a display of the custom digital product on the display device.

* * * * *